(12) United States Patent
Yoshitsugu et al.

(10) Patent No.: US 7,426,085 B2
(45) Date of Patent: Sep. 16, 2008

(54) LENS BARREL, IMAGING DEVICE AND CAMERA

(75) Inventors: Keiki Yoshitsugu, Sakai (JP); Yoshiharu Yamamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 109 days.

(21) Appl. No.: 11/264,095

(22) Filed: Nov. 2, 2005

(65) Prior Publication Data
US 2006/0098306 A1    May 11, 2006

(30) Foreign Application Priority Data

Nov. 5, 2004  (JP) .............................. 2004-322817
Feb. 16, 2005  (JP) .............................. 2005-039519

(51) Int. Cl.
*G02B 7/02*  (2006.01)
*G02B 15/14*  (2006.01)

(52) U.S. Cl. ..................... 359/819; 359/823; 359/687
(58) Field of Classification Search ......... 359/819–823, 359/676–795
See application file for complete search history.

(56) References Cited

U.S. PATENT DOCUMENTS

| | | | |
|---|---|---|---|
| 3,709,131 A | | 1/1973 | Plummer .................... 396/350 |
| 5,448,319 A | * | 9/1995 | Iuzawa ........................ 396/419 |
| 5,648,835 A | * | 7/1997 | Uzawa ........................ 396/429 |
| 2003/0147146 A1 | | 8/2003 | Mikami ....................... 359/694 |
| 2003/0156832 A1 | | 8/2003 | Nomura et al. | |
| 2003/0161620 A1 | | 8/2003 | Hagimori et al. | |
| 2004/0169764 A1 | | 9/2004 | Ishii et al. .................... 348/340 |
| 2005/0036777 A1 | | 2/2005 | Nomura et al. | |

FOREIGN PATENT DOCUMENTS

| | | |
|---|---|---|
| JP | 55-52041 | 4/1980 |
| JP | 58-76824 | 5/1983 |
| JP | 2003-156789 A | 5/2003 |
| JP | 2003-169236 A | 6/2003 |
| JP | 2003-202500 A | 7/2003 |
| JP | 2003-262907 | 9/2003 |
| JP | 2003-315861 A | 11/2003 |
| JP | 2004-102089 A | 4/2004 |
| JP | 2004-118101 A | 4/2004 |

OTHER PUBLICATIONS

Partial European Search Report, dated Feb. 3, 2006.
European Search Report issued in corresponding European Patent Application No. EP 05 02 3854, Dated Aug. 8, 2006.

* cited by examiner

*Primary Examiner*—Mohammed Hasan
(74) *Attorney, Agent, or Firm*—McDermott Will & Emery LLP

(57) ABSTRACT

In a lens barrel for holding an imaging optical system that forms an optical image of an object, the imaging optical system comprises an object side lens unit 4 onto which light ray from the object is incident and a reflective optical element 5 having a reflecting surface 5a for bending the light ray exiting from the object side lens unit 4, and in an imaging state, the object side lens unit 4 is held in a manner movable in a direction of the light ray from the object, and while in an accommodated state, the reflective optical element 5 is escaped to an escape position different from a position located in the imaging state.

24 Claims, 24 Drawing Sheets

F 2.90
d-LINE
F-LINE  C-LINE

−0.10  0.00  0.10

W=29.74
s
m

−0.05  0.00  0.05

W=29.74

−0.50  0.00  0.50

F 3.84

−0.10  0.00  0.10

W=10.20

−0.05  0.00  0.05

W=10.20

−0.50  0.00  0.50

F 4.04

−0.10  0.00  0.10

W=3.27

−0.05  0.00  0.05

W=3.27

−0.50  0.00  0.50

F 2.89 d-LINE
F-LINE
C-LINE

W=29.75 s
m

W=29.75

F 3.78

W=10.20

W=10.20

F 3.79

W=3.27

W=3.27

F 2.89 d-LINE
F-LINE
C-LINE
-0.10  0.00  0.10

W=29.74 s
m
-0.05  0.00  0.05

W=29.74

-0.50  0.00  0.50

F 3.94

-0.10  0.00  0.10

W=10.20

-0.05  0.00  0.05

W=10.20

-0.50  0.00  0.50

F 4.20

-0.10  0.00  0.10

W=3.28

-0.05  0.00  0.05

W=3.28

-0.50  0.00  0.50

F 2.89
d-LINE
F-LINE
C-LINE
-0.10 0.00 0.10

W=29.74
s
m
-0.05 0.00 0.05

W=29.74
-0.50 0.00 0.50

F 3.90
-0.10 0.00 0.10

W=10.20
-0.05 0.00 0.05

W=10.20
-0.50 0.00 0.50

F 4.09
-0.10 0.00 0.10

W=3.27
-0.05 0.00 0.05

W=3.27
-0.50 0.00 0.50

FIG. 20A  F 2.89
FIG. 20B  W=29.75
FIG. 20C  W=29.75
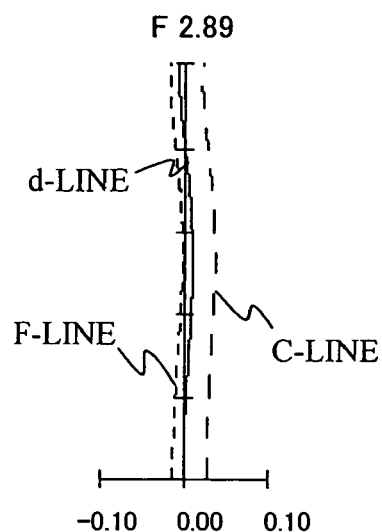
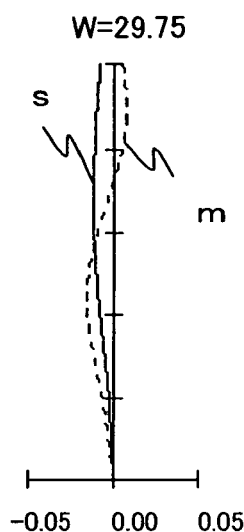
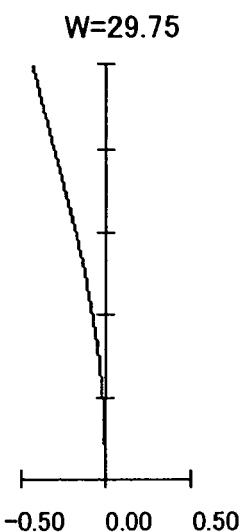
FIG. 20D  F 3.75
FIG. 20E  W=10.21
FIG. 20F  W=10.21
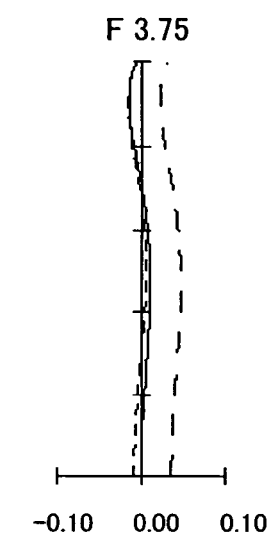
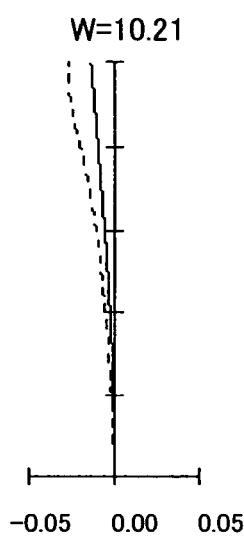
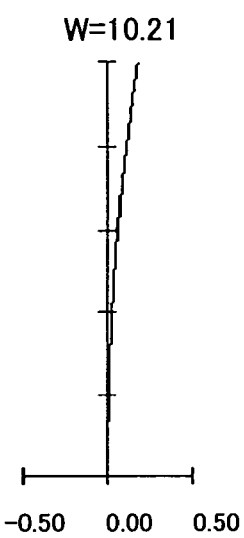
FIG. 20G  F 4.13
FIG. 20H  W=3.28
FIG. 20I  W=3.28
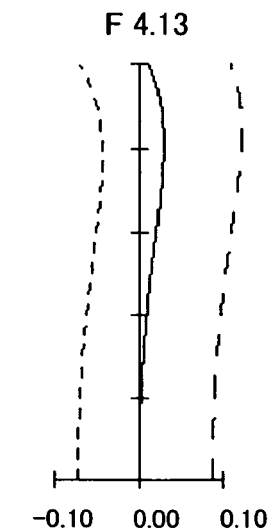
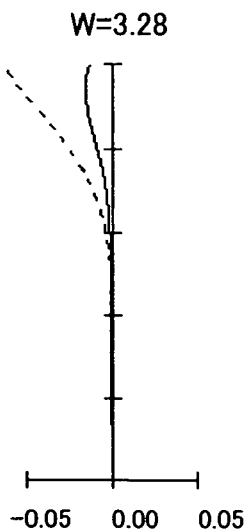
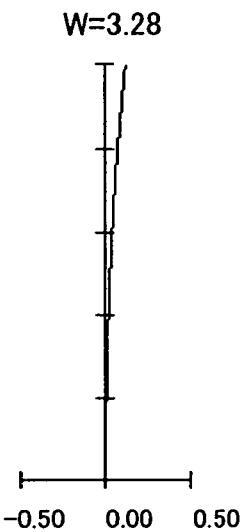

FIG. 22A
F 2.87
d-LINE
F-LINE
C-LINE
-0.10  0.00  0.10
FIG. 22B
W=29.75
s
m
-0.05  0.00  0.05
FIG. 22C
W=29.75
-0.50  0.00  0.50
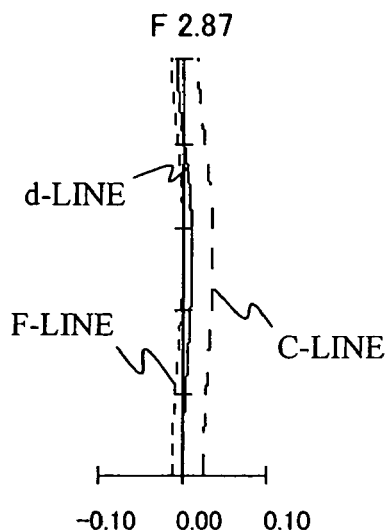
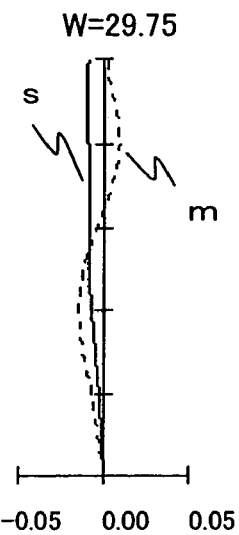
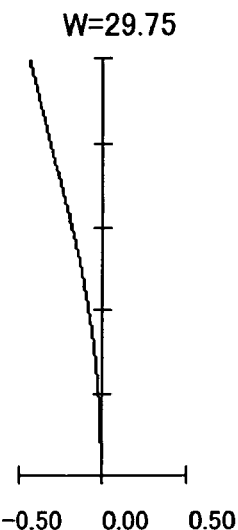
FIG. 22D
F 3.75
-0.10  0.00  0.10
FIG. 22E
W=10.21
-0.05  0.00  0.05
FIG. 22F
W=10.21
-0.50  0.00  0.50
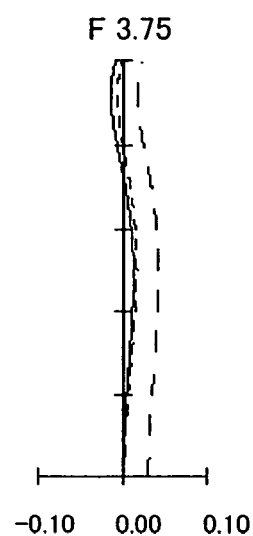
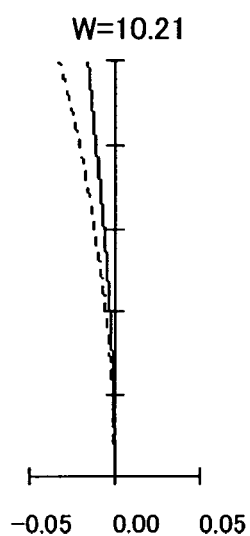
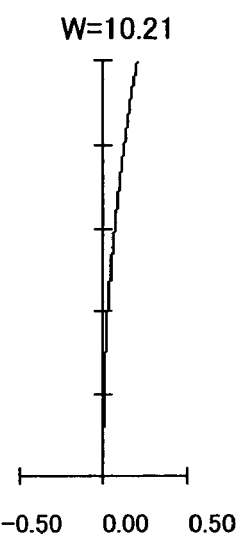
FIG. 22G
F 3.97
-0.10  0.00  0.10
FIG. 22H
W=3.27
-0.05  0.00  0.05
FIG. 22I
W=3.27
-0.50  0.00  0.50
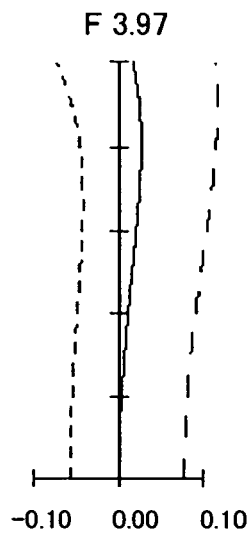
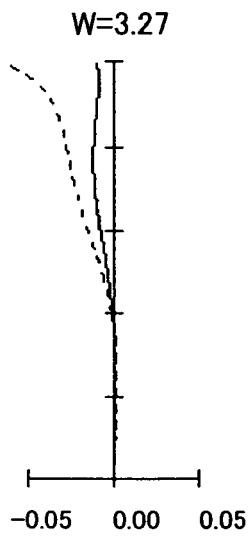
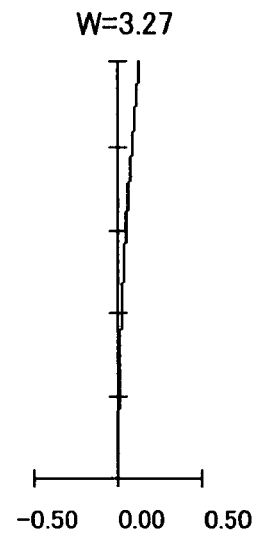

F 3.02

−0.10  0.00  0.10

W=29.76

−0.05  0.00  0.05

W=29.76

−0.50  0.00  0.50

F 4.27

−0.10  0.00  0.10

W=10.21

−0.05  0.00  0.05

W=10.21

−0.50  0.00  0.50

F 4.63

−0.10  0.00  0.10

W=3.28

−0.05  0.00  0.05

W=3.28

−0.50  0.00  0.50

LENS BARREL, IMAGING DEVICE AND CAMERA

CROSS-REFERENCE TO RELATED APPLICATION

This application is based on application Nos. 2004-322817 filed in Japan on Nov. 5, 2004 and 2005-39519 filed in Japan on Feb. 16, 2005, the content of which is hereby incorporated by reference.

BACKGROUND

1. Technical Field

The present invention relates to a lens barrel, an imaging device and a camera, and in particular to a lens barrel provided with a small-size and high-image-quality imaging optical system, such as a lens system, suitable for a digital still camera, a digital video camera or the like (simply also referred to as a camera, hereinafter), and an imaging device, as well as a camera provided with this imaging device.

2. Description of the Background Art

With recent progress in the development of solid-state image sensor such as a CCD (Charge Coupled Device) and a CMOS (Complementary Metal-Oxide Semiconductor) having a high pixel, digital still cameras and digital video cameras are rapidly spreading that employ an imaging device including an imaging optical system of high optical performance corresponding to a solid-state image sensor of high pixel.

Among these, especially in digital still cameras, constructions have recently been proposed in which a thin body is employed in order to achieve satisfactory accommodation property or portability to which the highest priority is imparted. In order to realize such digital still cameras having a thin body, an importance is present in taking into consideration the arrangement construction of the imaging device when not in use, that has a relatively large volume among the components of the digital still camera.

For example, Japanese Laid-Open Patent Publication No. 2003-315861 discloses a lens barrel in which in a retracted state, part of optical elements constituting an imaging optical system (typically, a lens unit in a zoom lens system) is escaped to a position different from that in a shooting state. More specifically, in the lens barrel disclosed in Japanese Laid-Open Patent Publication No. 2003-315861, in an imaging optical system composed of three lens units consisting of a first lens unit through a third lens unit, a second lens unit is escaped in a direction perpendicular to the optical axis of the first lens unit and the third lens unit, while these lens units are escaped to the image side, so that retraction is performed. As a result, the overall thickness is reduced.

Further, Japanese Laid-Open Patent Publication No. 2003-202500 discloses a construction in which in an imaging device provided with a zoom lens system, a right-angle prism provided with an internal reflecting surface for bending a light beam by 90° is arranged inside a lens unit located on the most object side. In the imaging device described in Japanese Laid-Open Patent Publication No. 2003-202500, since the object light is bent into a plane perpendicular to the optical axis of the incident lens unit, the thickness of the imaging device is determined by the right-angle prism and the lens elements located on the object side relative to the right-angle prism. This reduces the thickness.

Further, Japanese Laid-Open Patent Publication No. 2004-102089 discloses a construction in which in an imaging device provided with a zoom lens system composed of four units having a construction of positive, negative, positive and positive, a right-angle prism provided with an internal reflecting surface for bending a light beam by 90° is arranged inside a second lens unit having negative optical power. In the imaging device described in Japanese Laid-Open Patent Publication No. 2004-102089, the right-angle prism can be arranged inside the lens unit located on the image side relative to the first lens unit having positive optical power. This allows the right-angle prism to be constructed compactly.

Further, Japanese Laid-Open Patent Publication No. 2004-118101 discloses a zoom lens system having a retraction construction in which the lens elements are driven backward to the image side in an accommodated state so that the overall length is reduced. In the zoom lens system described in Japanese Laid-Open Patent Publication No. 2004-118101, in an accommodated state, an optical filter located on the most image side in the imaging optical system is escaped in a direction perpendicular to the optical axis, so that the overall length is reduced in a retracted state.

Further, Japanese Laid-Open Patent Publication No. 2003-156789 discloses an electronic camera having a lens barrel of retraction type. The electronic camera described in Japanese Laid-Open Patent Publication No. 2003-156789 comprises: a lens unit for receiving an object light beam; a lens frame that supports the lens unit and that is provided in a manner manually movable along a first optical axis between a usage position protruding in front of the body and an accommodated position where the barrel is escaped to the inside of the body; a reflecting mirror for bending the light beam exiting the lens unit; and an image sensor for receiving the light beam bent by the reflecting mirror. In this construction, the reflecting mirror moves to the reflection position (usage position) where the light beam having passed through the lens unit can be led to the image sensor, as well as moves to an escape position where in response to the movement to the accommodated position of the lens frame, an accommodating space can be ensured for the lens frame in the accommodated position.

Nevertheless, the lens barrel described in Japanese Laid-Open Patent Publication No. 2003-315861 has a problem that a considerably complicated mechanism is necessary for escaping the optical element and that extremely high precision is required in machining and assembling of the components of this mechanism. Further, since a specific optical element is solely escaped, the thickness of the imaging device is determined by the optical elements not escaped, so that thickness reduction is limited. Furthermore, in a zoom lens system having a large magnification variation ratio exceeding 3×, a multi-component zoom lens system is used that comprises four or more lens units. Nevertheless, when the lens barrel described in Japanese Laid-Open Patent Publication No. 2003-315861 is applied to such a multi-component zoom lens system, a problem arises that the mechanism becomes complicated whereas the merit of thickness reduction became small.

Further, in the zoom lens system described in Japanese Laid-Open Patent Publication No. 2003-202500, since the reflecting surface is arranged in the lens unit located on the most object side, a problem arises that a large reflecting surface is necessary. In the zoom lens system described in Japanese Laid-Open Patent Publication No. 2003-202500, the thickness of the imaging device is determined by the size of the reflecting surface. Thus, it is undesirable that the reflecting surface becomes large. Further, a bright imaging optical system having a small F-number is difficult to be designed without enlarging the reflecting surface. The situation is similarly undesirable.

Further, in the zoom lens system described in Japanese Laid-Open Patent Publication No. 2004-102089, the distance from the lens element located on the most object side to the reflecting surface cannot largely differ from the distance from the reflecting surface to the image sensor. This places a limit on the overall thickness reduction.

Further, in the zoom lens system described in Japanese Laid-Open Patent Publication No. 2004-118101, size reduction is achieved merely for the amount corresponding to the thickness of the optical filter. This thickness reduction can be insufficient.

Further, in the lens barrel included in the electronic camera described in Japanese Laid-Open Patent Publication No. 2003-156789, the lens unit located on the object side relative to the reflecting mirror is fixed in the shooting state. Thus, a sufficiently large magnification variation ratio is difficult to be obtained in the imaging optical system.

An object of the present invention is to provide a compact lens barrel that holds an imaging optical system such as a zoom lens system, having a magnification variation ratio of 5× or greater and a high resolution and that has a short overall length in an accommodated state, and an imaging device having this lens barrel. Another object of the present invention is to provide a camera having this imaging device.

SUMMARY

The novel concepts disclosed herein were achieved in order to solve the foregoing problems in the conventional art, and herein is disclosed: a lens barrel for holding an imaging optical system that forms an optical image of an object, wherein the imaging optical system comprises an object side lens unit onto which light ray from the object is incident, and a reflective optical element having a reflecting surface for bending the light ray exiting from the object side lens unit, and wherein in an imaging state, the object side lens unit is held in a manner movable in a direction of the light ray from the object, while in an accommodated state, the reflective optical element is escaped to an escape position different from a position located in the imaging state.

The novel concepts disclosed herein were achieved in order to solve the foregoing problems in the conventional art, and herein is disclosed: an imaging device capable of outputting an optical image of an object as an electric image signal, comprising a lens barrel for holding an imaging optical system that forms the optical image of the object, and an image sensor for converting the optical image formed by the imaging optical system into the electric image signal, wherein the imaging optical system comprises an object side lens unit onto which light ray from the object is incident, and a reflective optical element having a reflecting surface for bending the light ray exiting from the object side lens unit, and wherein in an imaging state, the object side lens unit is held in a manner movable in a direction of the light ray from the object, while in an accommodated state, the reflective optical element is escaped to an escape position different from a position located in the imaging state.

The novel concepts disclosed herein were achieved in order to solve the foregoing problems in the conventional art, and herein is disclosed: a camera for converting an optical image of an object into an electric image signal and then performing at least one of displaying and storing of the converted image signal, comprising a body, and an imaging device including a lens barrel for holding an imaging optical system that forms the optical image of the object, and an image sensor for converting the optical image formed by the imaging optical system into the electric image signal, wherein the imaging optical system comprises an object side lens unit onto which light ray from the object is incident, and a reflective optical element having a reflecting surface for bending the light ray exiting from the object side lens unit, and wherein in an imaging state, the object side lens unit is held in a manner movable in a direction of the light ray from the object, while in an accommodated state, the reflective optical element is escaped to an escape position different from a position located in the imaging state.

The present invention realizes a compact lens barrel that holds an imaging optical system, such as a zoom lens system, having a magnification variation ratio of 5× or greater and a high resolution, and that has a short overall length in an accommodated state; and an imaging device having this lens barrel. The present invention further realizes a camera having this imaging device.

BRIEF DESCRIPTION OF THE DRAWINGS

This and other objects and features of this invention will become clear from the following description, taken in conjunction with the preferred embodiments with reference to the accompanied drawings in which:

FIGS. 20A to 20I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 5;

FIGS. 22A to 22I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 6;

DESCRIPTION OF THE PREFERRED EMBODIMENTS

Embodiment 1

Figure 1A:
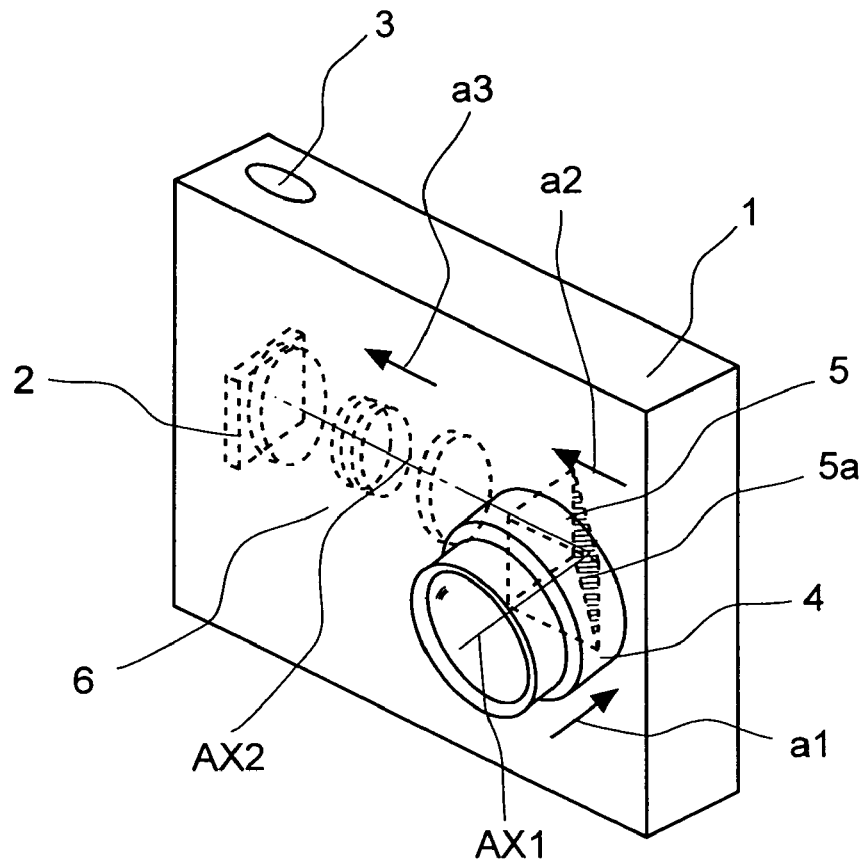
FIG. 1A is a transparent perspective view showing a diagrammatic construction in an imaging state of a camera employing an imaging device according to Embodiment 1.
Figure 1B:
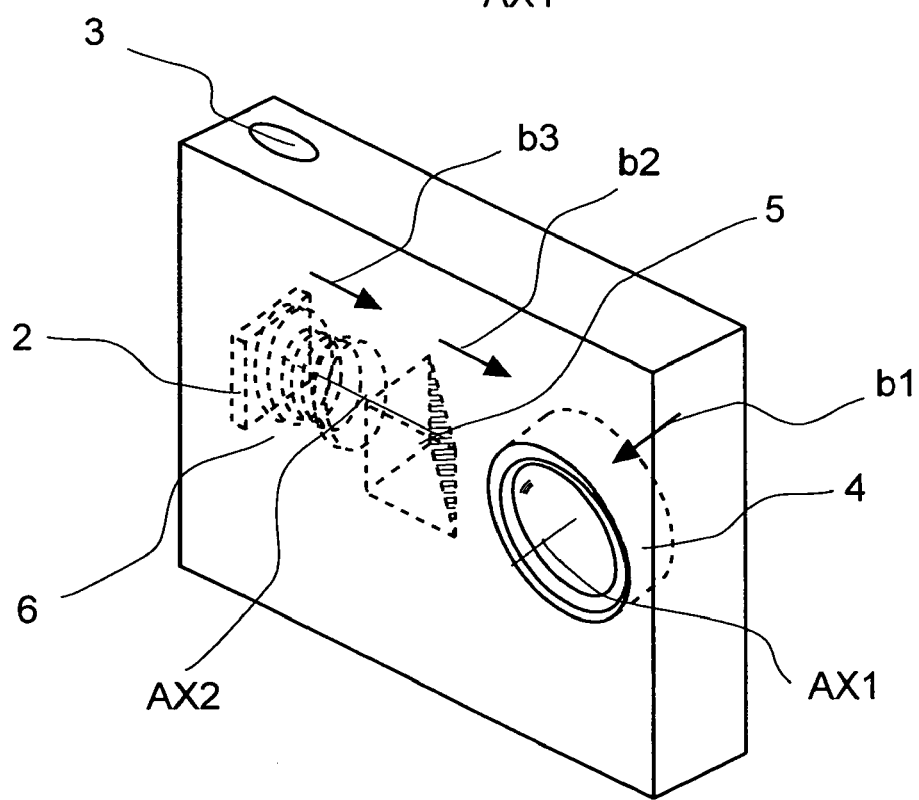
FIG. 1B is a transparent perspective view showing a diagrammatic construction in an accommodated state of a camera employing an imaging device according to Embodiment 1.

FIG. 1A is a transparent perspective view showing a diagrammatic construction in an imaging state of a camera employing an imaging device according to Embodiment 1. FIG. 1B is a transparent perspective view showing a diagrammatic construction in an accommodated state of a camera employing an imaging device according to Embodiment 1. Here, FIGS. 1A and 1B are drawings schematically showing an imaging device according to Embodiment 1. Thus, the scale and the detailed layout can differ from actual ones.

In FIGS. 1A and 1B, a camera employing an imaging device according to Embodiment 1 comprises: a body 1, an image sensor 2, a shutter button 3, an object side lens unit 4, a reflective optical element 5 and an image side lens unit 6. Among these, the object side lens unit 4, the reflective optical element 5 and the image side lens unit 6 constitute the imaging optical system, and thereby form an optical image of an object in the light acceptance surface of the image sensor 2. The imaging optical system is held with a lens barrel described later. Further, the lens barrel and the image sensor 2 constitute an imaging device. Accordingly, the camera comprises the body 1, and the imaging device including the lens barrel and the image sensor 2.

In an imaging state shown in FIG. 1A, the image sensor 2 is an image sensor such as a CCD or a CMOS, and generates and outputs an electric image signal on the basis of the optical image formed in the light acceptance surface by the imaging optical system. The shutter button 3 is arranged on the top face of the body 1, and determines the acquisition timing for an image signal of the image sensor 2 when operated by an operator. The object side lens unit 4 is held inside a lens holding barrel which can be expanded and contracted along the direction of the optical axis AX1. The reflective optical element 5 is provided with a reflecting surface 5a for bending by approximately 90° the optical axis AX1 of the object side lens unit 4 (an axial principal ray from the object), and thereby deflects the object light exiting from the object side lens unit 4 toward the image side lens unit 6. The image side lens unit 6 is arranged on the optical axis AX2, and thereby transmits the object light deflected by the reflecting surface 5a to the image sensor 2.

In an accommodated state shown in FIG. 1B, the object side lens unit 4 is retracted and accommodated into the body 1. The reflective optical element 5 arranged on the image side of the object side lens unit 4 in the imaging state is escaped to the image sensor 2 side along the optical axis AX2. The image side lens unit 6 is also escaped to the image sensor 2 side along the optical axis AX2. As such, the imaging optical system is completely accommodated into the body 1.

In transition from the imaging state shown in FIG. 1A to the accommodated state shown in FIG. 1B, the image side lens unit 6 first moves toward the image sensor 2 along the optical axis AX2 as indicated by an arrow a3. Then, the reflective optical element 5 moves toward the image sensor 2 along the optical axis AX2 as indicated by an arrow a2. Finally, the lens barrel for holding the object side lens unit 4 is retracted along the optical axis AX1 as indicated by an arrow al into the space formed by the movement of the image side lens unit 6 and the reflective optical element 5. As a result, the transition to the accommodated state is completed.

On the contrary, in transition from the accommodated state shown in FIG. 1B to the imaging state shown in FIG. 1A, the lens holding barrel for holding the object side lens unit 4 is drawn out along the optical axis AX1 as indicated by an arrow b1. The reflective optical element 5 moves along the optical axis AX2 as indicated by an arrow b2 into the space formed by the draw-out of the lens holding barrel for holding the object side lens unit 4. Further, the image side lens unit 6 moves along the optical axis AX2 as indicated by an arrow b3, so that the transition to the imaging state is completed.

Figure 2A:
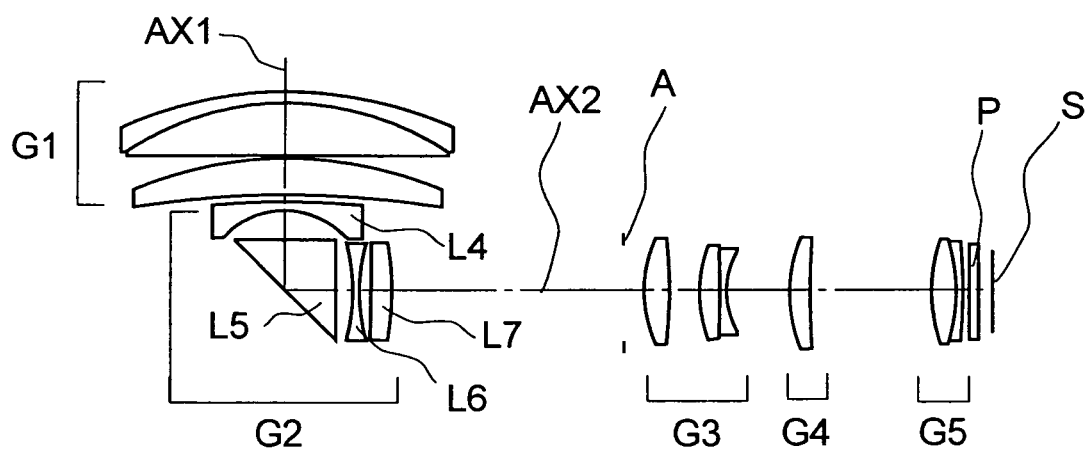
FIG. 2A is a lens arrangement diagram showing an arrangement of an imaging optical system in an imaging state at a wide-angle limit in Embodiment 1.
Figure 2B:
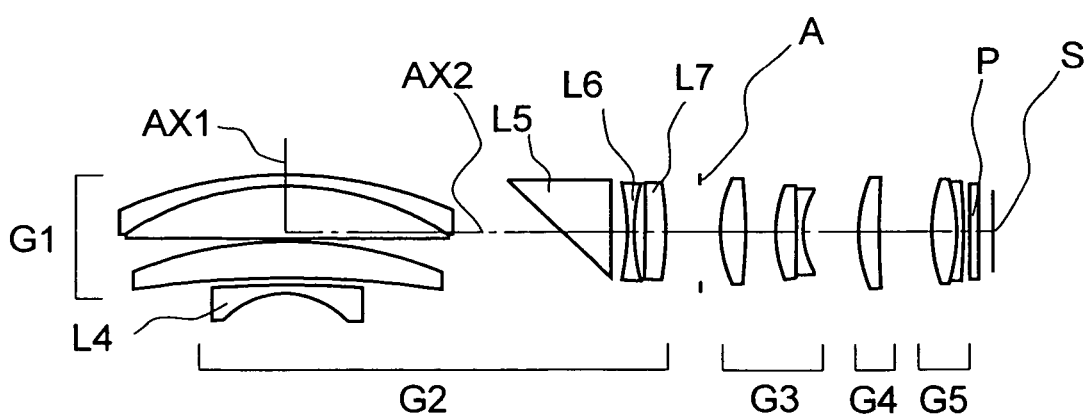
FIG. 2B is a lens arrangement diagram showing an arrangement of an imaging optical system in an accommodated state in Embodiment 1.

FIG. 2A is a lens arrangement diagram showing an arrangement of the imaging optical system in the imaging state at a wide-angle limit in Embodiment 1. FIG. 2B is a lens arrangement diagram showing an arrangement of the imaging optical system in the accommodated state in Embodiment 1. The imaging optical system according to Embodiment 1 is a zoom lens system. The zoom lens system according to Embodiment 1, in order from the object side to the image side, comprises: a first lens unit G1 having positive optical power; a second lens unit G2 having negative optical power; and subsequently a diaphragm A, a third lens unit G3, a fourth lens unit G4 and a fifth lens unit G5. Further, a straight line drawn on the right most side in the figure indicates the position of an image surface S. On its object side, a plane parallel plate P such as an optical low-pass filter, a face plate of the image sensor or the like is provided. A prism L5 serving as a reflective optical element is arranged inside the second lens unit G2.

In the zoom lens system according to Embodiment 1, in the accommodated state shown in FIG. 2B, the second lens unit G2 components are accommodated in a manner that a negative meniscus lens element L4 located on the most object side is separated from the prism L5 serving as a reflective optical element and subsequent lens elements L6 and L7. That is, the negative meniscus lens element L4 is held separately from the prism L5 and the subsequent lens elements L6 and L7, and hence is not follow the escape along the optical axis AX2 performed by a lens block consisting of the prism L5 and the subsequent lens elements L6 and L7. Thus, the negative meniscus lens element L4 is retracted and accommodated along the optical axis AX1 together with the first lens unit G1.

Figure 3A:
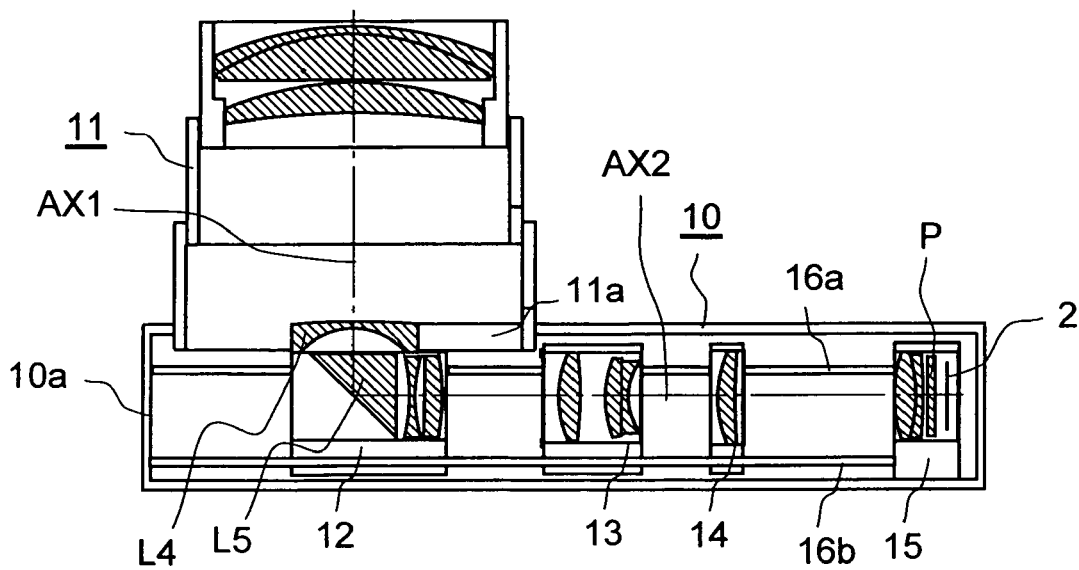
FIG. 3A is a sectional view showing an arrangement of a lens barrel in an imaging state at a telephoto limit of an imaging device according to Embodiment 1.
Figure 3B:
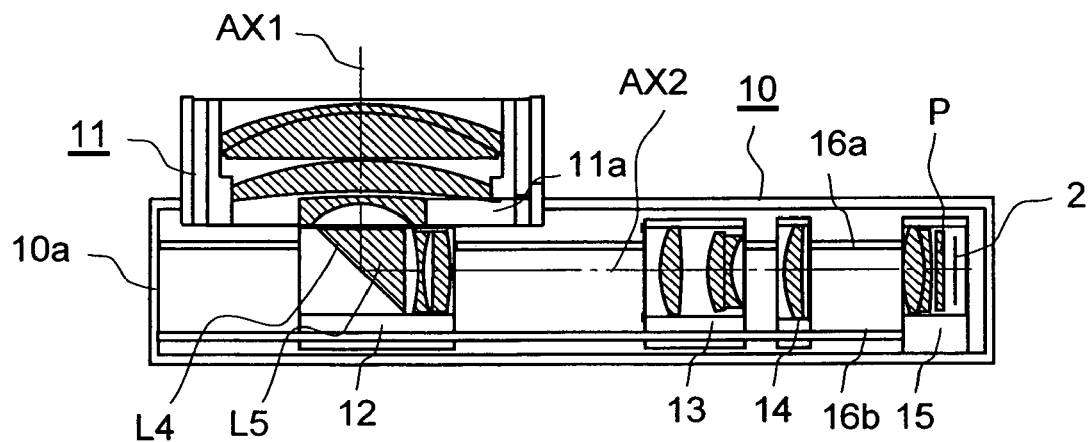
FIG. 3B is a sectional view showing an arrangement of a lens barrel in an imaging state at a wide-angle limit of an imaging device according to Embodiment 1.
Figure 3C:
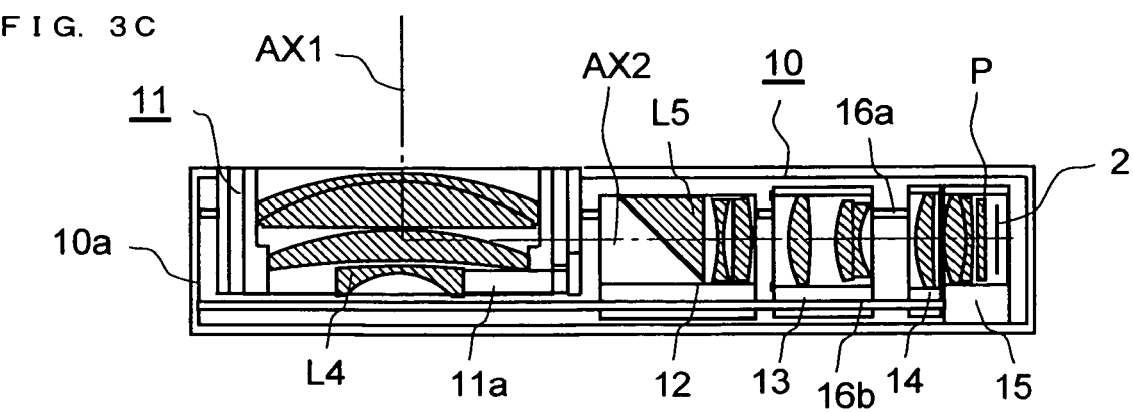
FIG. 3C is a sectional view showing an arrangement of a lens barrel in an accommodated state of an imaging device according to Embodiment 1.

FIGS. 3A to 3C are sectional views showing an arrangement of the lens barrel of the imaging device according to Embodiment 1. FIG. 3A is a sectional view showing an arrangement of the lens barrel in the imaging state at a telephoto limit. FIG. 3B is a sectional view showing an arrangement of the lens barrel in the imaging state at a wide-angle limit. FIG. 3C is a sectional view showing an arrangement of the lens barrel in the accommodated state.

The lens barrel of the imaging device according to Embodiment 1 comprises a main barrel 10, a first lens unit holding multi-stage barrel 11, a second lens unit holding barrel 12, a third lens unit holding barrel 13, a fourth lens unit holding barrel 14, a fifth lens unit holding barrel 15, a guide shaft 16a and a guide shaft 16b.

The main barrel 10 is a body capable of accommodating the entire construction of the imaging device in the accommodated state. In the imaging state shown in FIGS. 3A and 3B, the second lens unit holding barrel 12, the third lens unit holding barrel 13, the fourth lens unit holding barrel 14, the fifth lens unit holding barrel 15, the guide shaft 16a and the guide shaft 16b are located in the main barrel 10.

The first lens unit holding multi-stage barrel 11 is an expandable three-stage lens barrel. Draw-out and barrel escape along the optical axis AX1 are driven by a drive motor and a drive mechanism which are not shown. In the first lens unit holding multi-stage barrel 11, the first lens unit is held in a barrel having the smallest inner diameter. Further, a barrel having the largest inner diameter is provided with a holding section 11a for holding the negative meniscus lens element L4 located on the most object side in the second lens unit.

The second lens unit holding barrel 12 holds the components located on the image sensor side relative to the prism L5, among the second lens unit components. The third lens unit holding barrel 13 and the fourth lens unit holding barrel 14 hold the third lens unit and the fourth lens unit, respectively. The fifth lens unit holding barrel 15 holds the fifth lens unit, the plane parallel plate P and the image sensor 2.

The second lens unit holding barrel 12, the third lens unit holding barrel 13 and the fourth lens unit holding barrel 14 are guided on two guide shafts 16a and 16b arranged in parallel to the optical axis AX2, and held in a manner movable along the optical axis AX2. Further, the second lens unit holding barrel 12, the third lens unit holding barrel 13 and the fourth lens unit holding barrel 14 are driven along the optical axis AX2 by a drive motor and a drive mechanism which are not shown. In each of the guide shafts 16a and 16b, one end is held by the fifth lens unit holding barrel 15, while the other end is held at a top end 10a of the main barrel 10, so that the guide shafts are fixed.

As to the above-mentioned construction, in the imaging state at a telephoto limit shown in FIG. 3A, in the lens barrel, the first lens unit holding multi-stage barrel 11 is drawn out along the optical axis AX1 to the maximum, while the interval between the first lens unit and the second lens unit is maintained at maximum. Further, the second through the fifth lens unit holding barrels 12 to 15 are arranged respectively at predetermined positions on the optical axis AX2 at a telephoto limit.

In transition from the imaging state at a telephoto limit shown in FIG. 3A to the imaging state at a wide-angle limit shown in FIG. 3B, the first lens unit holding multi-stage barrel 11 is shortened along the optical axis AX2 to the minimum length, and then stops at a position where the interval between the first lens unit and the second lens unit becomes minimum. At that time, during the shortening of the first lens unit holding multi-stage barrel 11, the lens element L4 held in the holding section 11a of the first lens unit holding multi-stage barrel 11 is fixed such that the interval with the prism L5 should not vary. Further, the third and fourth lens unit holding barrels 13 to 14 move along the optical axis AX2 in a manner guided by the guide shafts 16a and 16b, and then stop respectively at predetermined positions on the optical axis AX2 at the wide-angle limit. During this movement, the second lens unit holding barrel 12 and the fifth lens unit holding barrel 15 are fixed.

In transition from the imaging state at the wide-angle limit shown in FIG. 3B to the accommodated state shown in FIG. 3C, the third and fourth lens unit holding barrels 13 to 14 move along the optical axis AX2 in a manner guided by the guide shafts 16a and 16b, and then stop respectively at predetermined positions such as to form a space for accommodating the second lens unit holding barrel 12. During this movement, the fifth lens unit holding barrel 15 is fixed. Further, the second lens unit holding barrel 12 moves along the optical axis AX2, and thereby escape the optical elements except for the lens element L4 located on the most object side among the second lens unit components. After that, the first lens unit holding multi-stage barrel 11 is retracted along the optical axis AX1 with maintaining the minimum length, thereby accommodated into the main barrel 10, and then stops.

As described above, according to the lens barrel of Embodiment 1, in the accommodated state, the reflective optical element can be escaped to an escape position different from the position located in the imaging state. Thus, the air space generated in the imaging state can be used effectively, so that an imaging optical system having a large air space such a zoom lens system having a large magnification can be accommodated in a manner compact and thin in the optical axis direction of the axial light beam from the object.

Further, according to the lens barrel of Embodiment 1, the reflective optical element has a reflecting surface for bending by approximately 90° the axial principal ray from the object. This permits a construction that in the imaging state, the imaging optical system becomes thin in the optical axis direction of the axial light beam from the object.

Further, according to the lens barrel of Embodiment 1, the imaging optical system comprises: an object side lens unit located on the object side relative to the reflective optical element; and an image side lens unit located on the image side relative to the reflective optical element. Thus, a complicated imaging optical system having a large amount of movement of the lens unit, such a zoom lens system having a high magnification, can be constructed in a manner compact and thin in the optical axis direction of the axial light beam from the object.

Further, according to the lens barrel of Embodiment 1, the reflective optical element is escaped in a direction perpendicular to the not-reflected axial principal ray from the object. This permits a construction that in the imaging state, the imaging optical system becomes thin in the optical axis direction of the axial light beam from the object. In particular, according to the lens barrel of Embodiment 1, retention is performed to the image side of the imaging optical system. Thus, the air space generated in the imaging state can be used as an accommodation space for the lens elements. This realizes a considerably compact accommodated state in the imaging optical system.

Further, according to the lens barrel of Embodiment 1, the imaging optical system, in order from the object side to the image side, comprises: a first lens unit having positive optical power; a second lens unit having negative optical power; and at least one subsequent lens unit. Further, a reflective optical element is arranged inside the second lens unit. Thus, the size can be reduced in the reflecting surface of the reflective optical element. In particular, the imaging optical system can be constructed in a manner thin in the optical axis direction of the axial light beam from the object. Further, the size can be reduced in the precise reflective optical element. This reduces the cost of the lens barrel.

Further, according to the lens barrel of Embodiment 1, the second lens unit, in order from the object side to the image side, includes: a negative meniscus lens element whose image side surface has the more intense optical power; a reflective optical element; and at least one subsequent lens element. This negative meniscus lens element reduces the incident angle at the time that the light beam from the object is incident on the reflecting surface.

In particular, according to the lens barrel of Embodiment 1, in the accommodated state, the negative meniscus lens element is separated from the reflective optical element, and hence is not escaped. This avoids the necessity that the negative meniscus lens element which has intense optical power and hence high decentration sensitivity is moved from the optical axis. Thus, in the transition from the accommodated state to the imaging state, restoration is achieved in a state that the relative spatial arrangement is maintained between the first lens unit and the lens element L4.

Figure 4A:
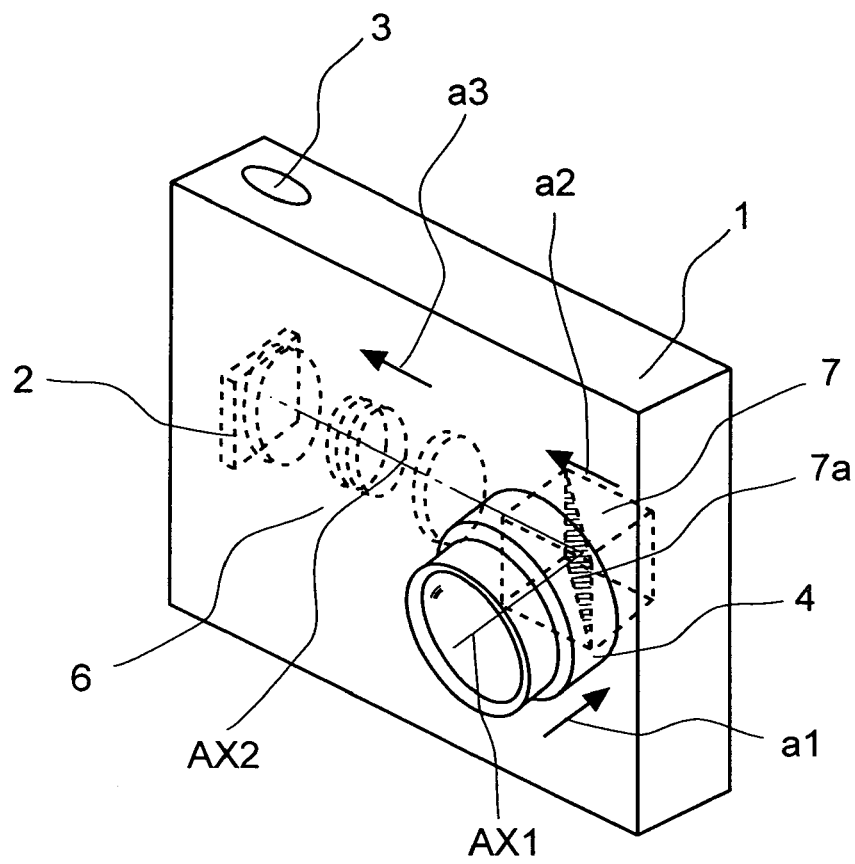
FIG. 4A is a transparent perspective view showing a diagrammatic construction in an imaging state of a camera employing an imaging device according to a modification of Embodiment 1.
Figure 4B:
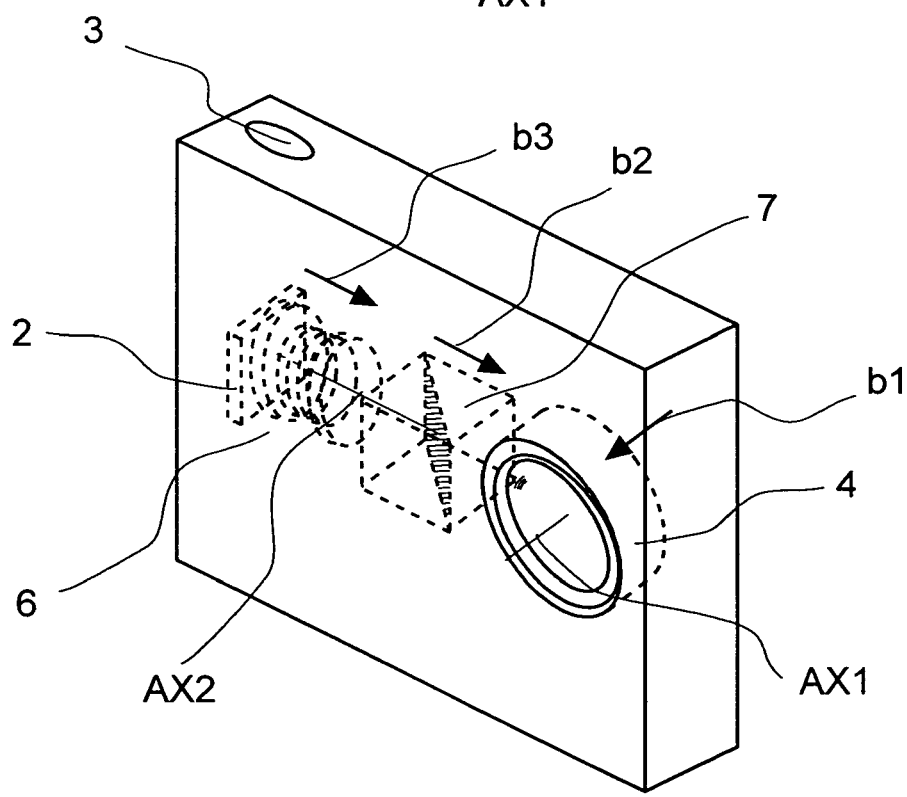
FIG. 4B is a transparent perspective view showing a diagrammatic construction in an accommodated state of a camera employing an imaging device according to a modification of Embodiment 1.

FIG. 4A is a transparent perspective view showing a diagrammatic construction in the imaging state of a camera employing an imaging device according to a modification of Embodiment 1. FIG. 4B is a transparent perspective view showing a diagrammatic construction in the accommodated state of a camera employing an imaging device according to a modification of Embodiment 1. In FIGS. 4A and 4B, the same components as Embodiment 1 are designated by the same numerals. Then, their description is omitted.

In the imaging device according to the modification, a prism 7 has a cube shape in contrast to the imaging device according to Embodiment 1 described above. As such, the embodiment of the reflective optical element having a reflecting surface is not limited to a specific one. Employable elements include: an internal reflection mirror having a parallel plate shape; a surface reflection mirror having a parallel plate shape; and a surface reflection prism. Further, the reflecting surface may be fabricated by any one of known methods including: vapor deposition of metal such as aluminum; and forming of a dielectric multilayer film. Further, the reflecting surface need not have a reflectance of 100%. Thus, the reflectance may be appropriately adjusted when light for photometry or for an optical finder system need be extracted from the object light, or alternatively when the optical system is used as part of an optical path for projecting auto-focusing auxiliary light or the like through the reflecting surface.

Embodiment 2

Figure 5A:
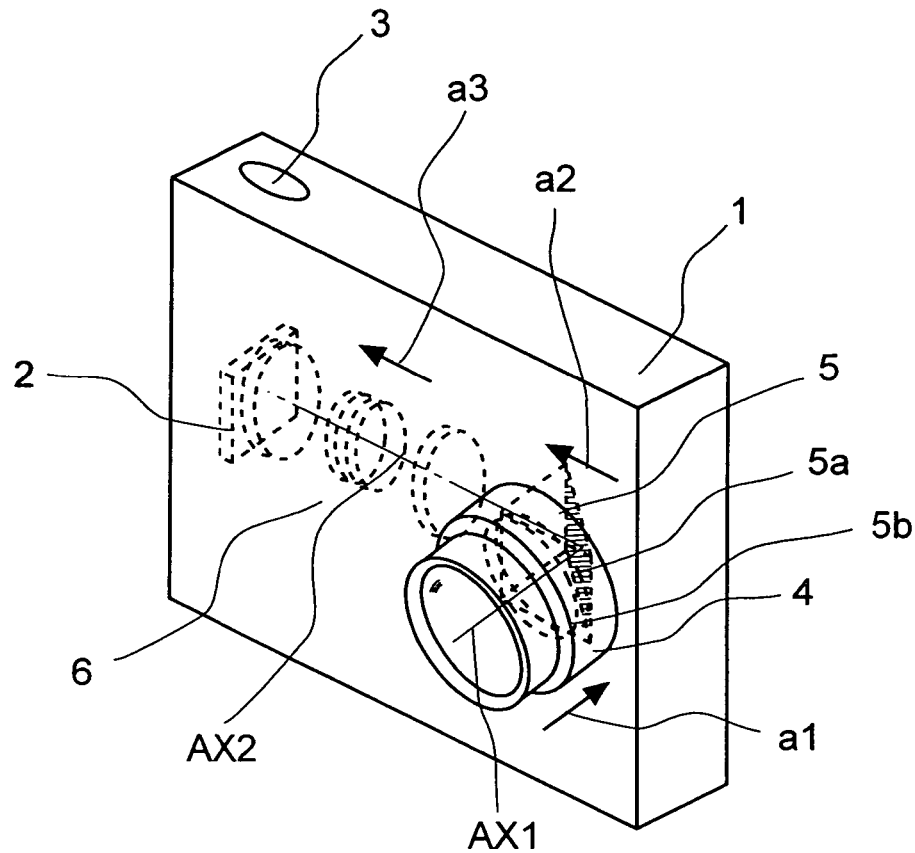
FIG. 5A is a transparent perspective view showing a diagrammatic construction in an imaging state of a camera employing an imaging device according to Embodiment 2.
Figure 5B:
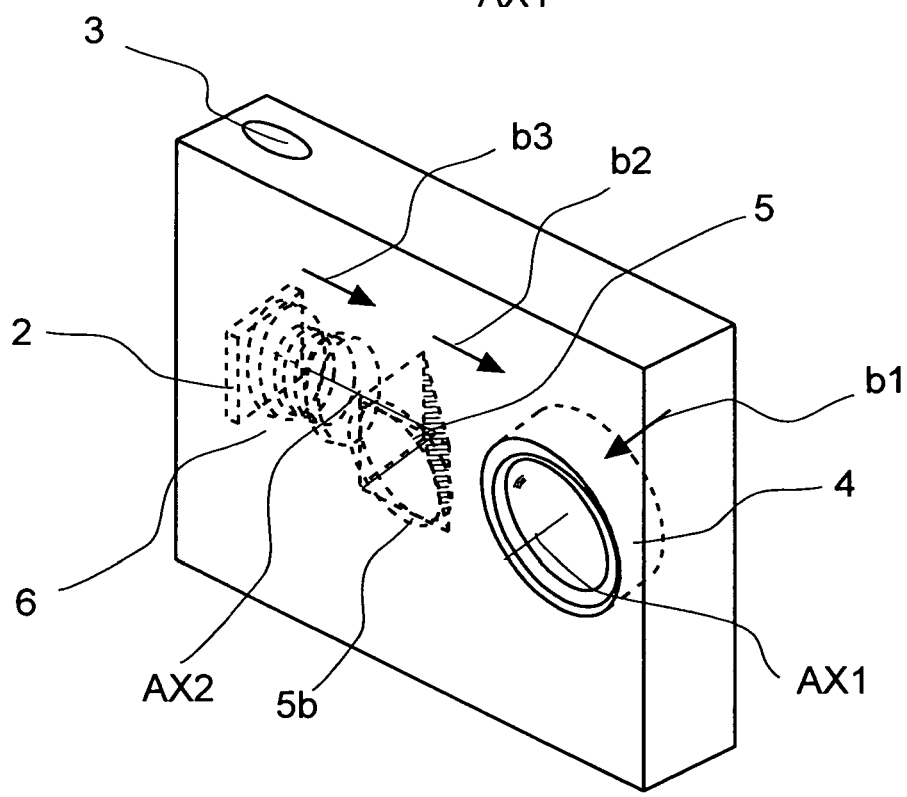
FIG. 5B is a transparent perspective view showing a diagrammatic construction in an accommodated state of a camera employing an imaging device according to Embodiment 2.

FIG. 5A is a transparent perspective view showing a diagrammatic construction in the imaging state of a camera employing an imaging device according to Embodiment 2. FIG. 5B is a transparent perspective view showing a diagrammatic construction in the accommodated state of a camera employing an imaging device according to Embodiment 2. In FIGS. 5A and 5B, the same components as Embodiment 1 are designated by the same numerals. Then, their description is omitted.

The imaging device according to Embodiment 2 is different from the imaging device according to Embodiment 1 in the point that the block escaped in the accommodated state includes a lens element 5b arranged on the object side relative to the reflective optical element 5.

In transition from the imaging state shown in FIG. 5A to the accommodated state shown in FIG. 5B, the image side lens unit 6 first moves toward the image sensor 2 along the optical axis AX2 as indicated by an arrow a3. Then, the reflective optical element 5 and the lens element 5b move toward the image sensor 2 along the optical axis AX2 as indicated by an arrow a2. Finally, the lens holding barrel for holding the object side lens unit 4 is retracted along the optical axis AX1 as indicated by an arrow a1 into the space formed by the movement of the image side lens unit 6, the reflective optical element 5 and the lens element 5b. As a result, the transition to the accommodated state is completed.

On the contrary, in transition from the accommodated state shown in FIG. 5B to the imaging state shown in FIG. 5A, the lens holding barrel for holding the object side lens unit 4 is drawn out along the optical axis AX1 as indicated by an arrow b1. The reflective optical element 5 and the lens element 5b move along the optical axis AX2 as indicated by an arrow b2 into the space formed by the draw-out of the lens holding barrel for holding the object side lens unit 4. Further, the image side lens unit 6 moves along the optical axis AX2 as indicated by an arrow b3, so that the transition to the imaging state is completed.

Figure 6A:
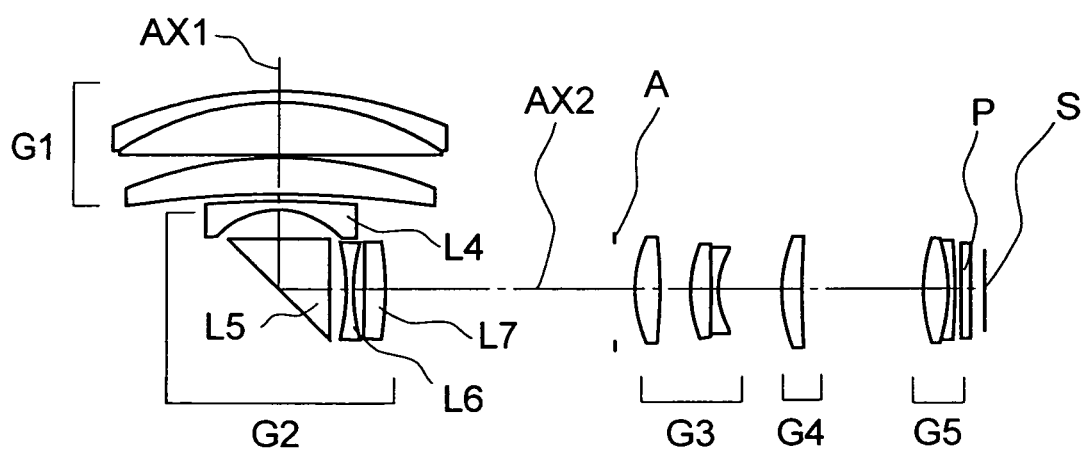
FIG. 6A is a lens arrangement diagram showing an arrangement of an imaging optical system in an imaging state at a wide-angle limit in Embodiment 2.
Figure 6B:
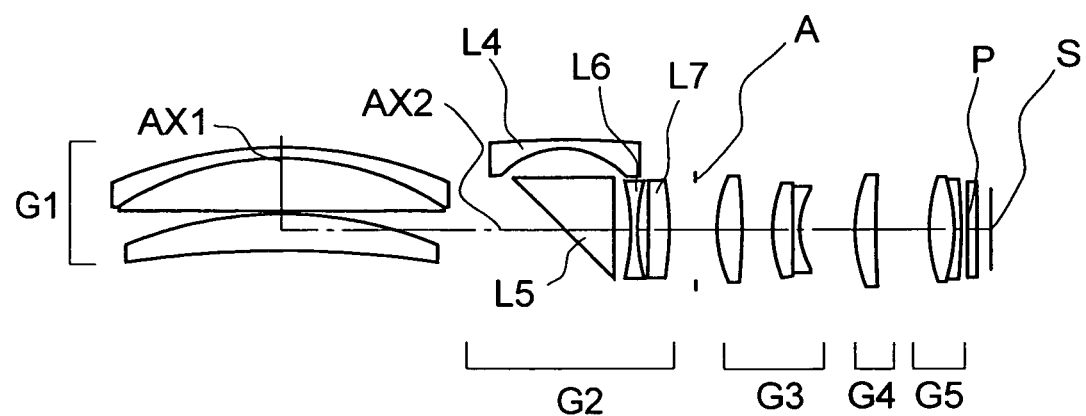
FIG. 6B is a lens arrangement diagram showing an arrangement of an imaging optical system in an accommodated state in Embodiment 2.

FIG. 6A is a lens arrangement diagram showing an arrangement of the imaging optical system in the imaging state at the wide-angle limit in Embodiment 2. FIG. 6B is a lens arrangement diagram showing an arrangement of the imaging optical system in the accommodated state in Embodiment 2. The imaging optical system according to Embodiment 2 is a zoom lens system. The zoom lens system according to Embodiment 2 has the same construction as the zoom lens system described in Embodiment 1. That is, the zoom lens system, in order from the object side to the image side, comprises: a first lens unit G1 having positive optical power; a second lens unit G2 having negative optical power; and subsequently a diaphragm A, a third lens unit G3, a fourth lens unit G4 and a fifth lens unit G5. Further, a straight line drawn on the right most side in the figure indicates the position of an image surface S. On its object side, a plane parallel plate P such as an optical low-pass filter, a face plate of the image sensor or the like is provided. A prism L5 serving as a reflective optical element is arranged inside the second lens unit G2.

In the zoom lens system according to Embodiment 2, in the accommodated state shown in FIG. 6B, the entirety of the second lens unit G2, that is, construction including the negative meniscus lens element L4 located on the most object side, the prism L5 serving as a reflective optical element and the subsequent lens elements L6 and L7, is escaped integrally.

Figure 7A:
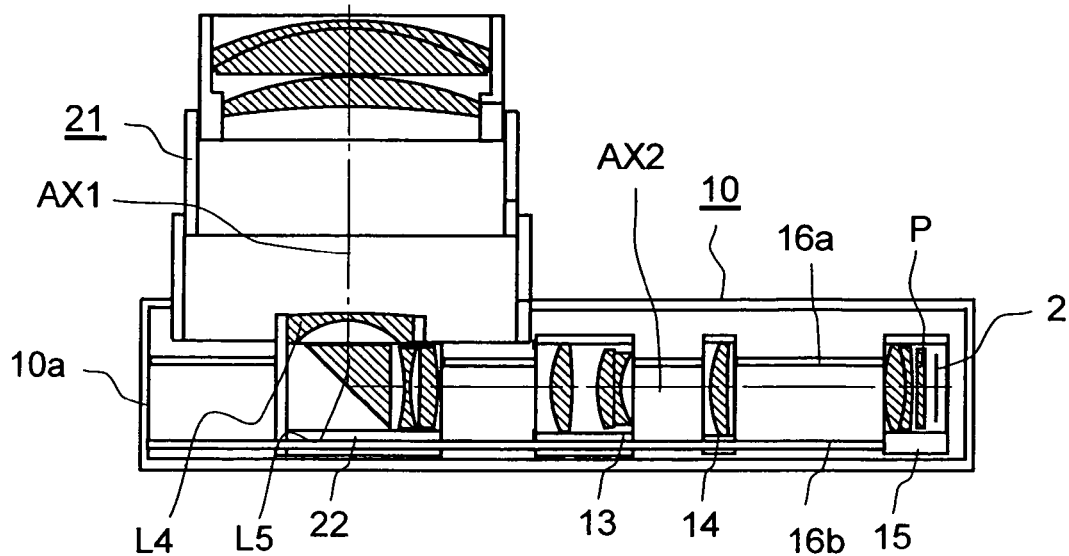
FIG. 7A is a sectional view showing an arrangement of a lens barrel in an imaging state at a telephoto limit of an imaging device according to Embodiment 2.
Figure 7B:
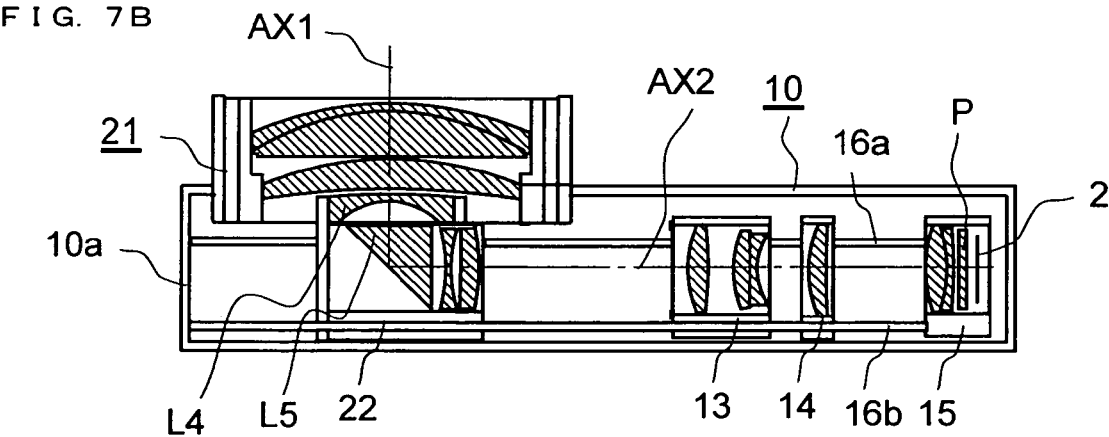
FIG. 7B is a sectional view showing an arrangement of a lens barrel in an imaging state at a wide-angle limit of an imaging device according to Embodiment 2.
Figure 7C:
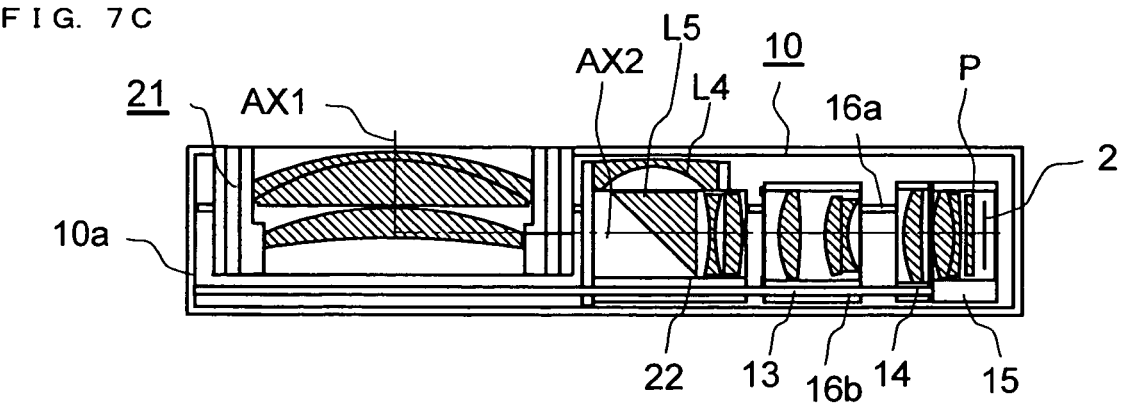
FIG. 7C is a sectional view showing an arrangement of a lens barrel in an accommodated state of an imaging device according to Embodiment 2.

FIGS. 7A to 7C are sectional views showing an arrangement of the lens barrel of the imaging device according to Embodiment 2. FIG. 7A is a sectional view showing an arrangement of the lens barrel in the imaging state at the telephoto limit. FIG. 7B is a sectional view showing an arrangement of the lens barrel in the imaging state at the wide-angle limit. FIG. 7C is a sectional view showing an arrangement of the lens barrel in the accommodated state. The lens barrel in Embodiment 2 is different from Embodiment 1 in the point that a second lens unit holding barrel 22 holds the entirety of the second lens unit from the lens element L4 via the prism L5 to the two subsequent lens elements.

In Embodiment 2, in transition from the imaging state at the telephoto limit shown in FIG. 7A to the imaging state at the wide-angle limit shown in FIG. 7B, operation is performed similarly to Embodiment 1. On the other hand, in transition from the imaging state at the wide-angle limit shown in FIG. 7B to the accommodated state shown in FIG. 7C, the second lens unit holding barrel 22 moves along the optical axis AX2, and thereby escapes the entire second lens unit. After that, a first lens unit holding multi-stage barrel 21 is retracted along the optical axis AX1 with maintaining the minimum length, thereby accommodated into the main barrel 10, and then stopped.

As described above, according to the lens barrel of Embodiment 2, in addition to the common construction described in Embodiment 1, in the accommodated state, the entire second lens unit is escaped together with the reflective optical element. Thus, in the transition from the accommodated state to the imaging state, restoration is achieved in a state that the relative positional relation is maintained in the second lens unit. This improves restoration accuracy.

Embodiment 3

Figure 8A:
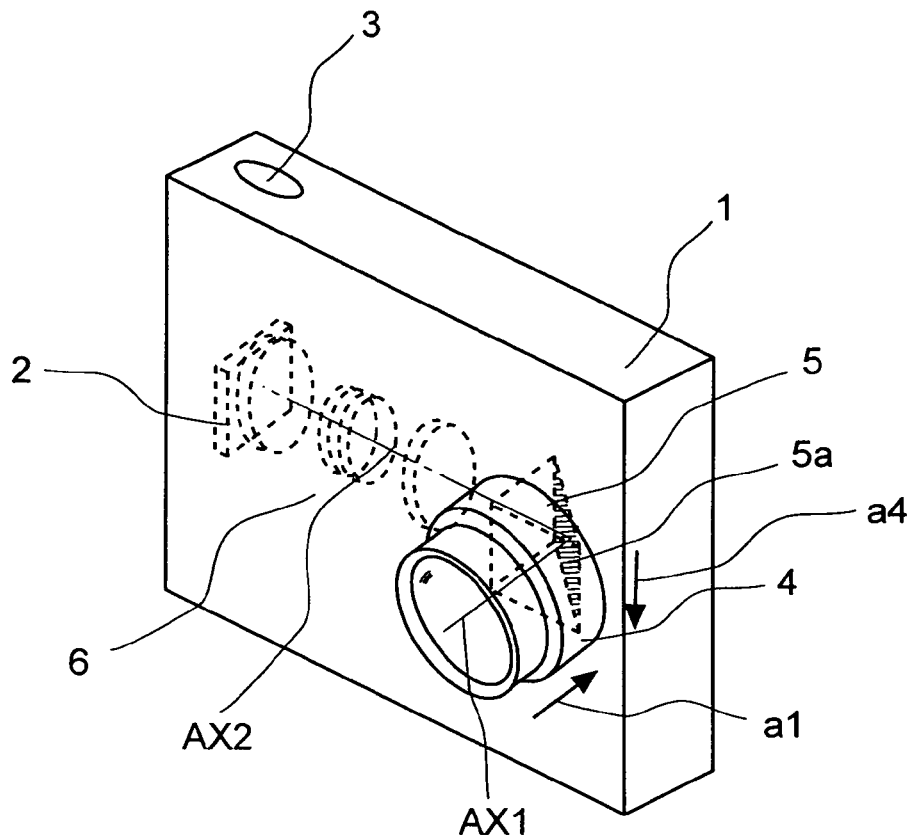
FIG. 8A is a transparent perspective view showing a diagrammatic construction in an imaging state of a camera employing an imaging device according to Embodiment 3.
Figure 8B:
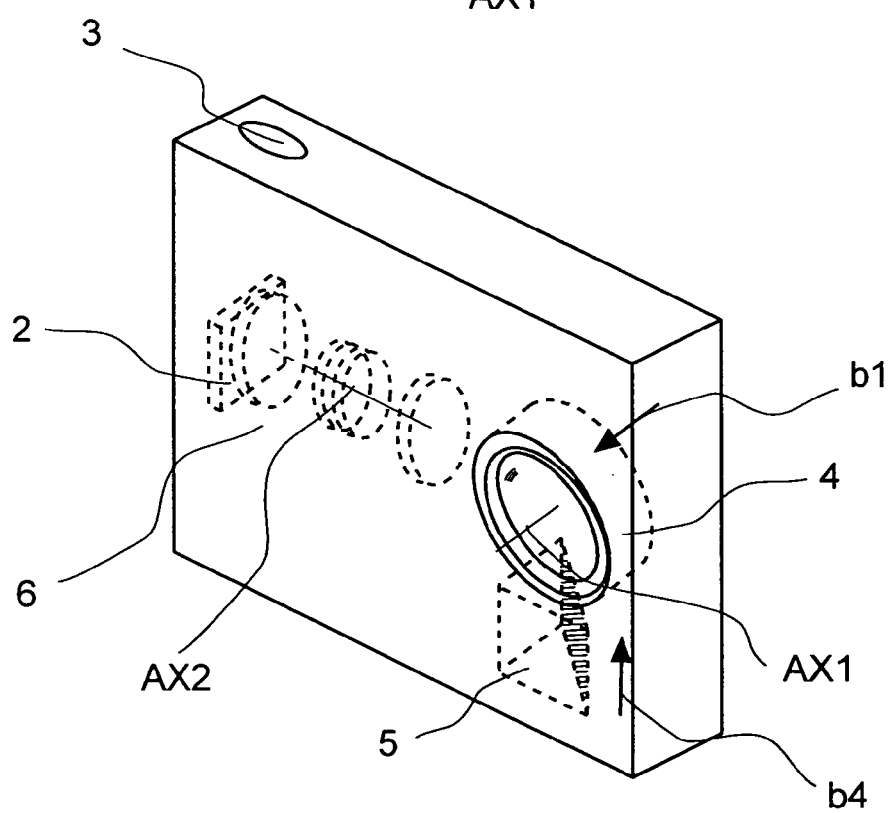
FIG. 8B is a transparent perspective view showing a diagrammatic construction in an accommodated state of a camera employing an imaging device according to Embodiment 3.

FIG. 8A is a transparent perspective view showing a diagrammatic construction in the imaging state of a camera employing an imaging device according to Embodiment 3. FIG. 8B is a transparent perspective view showing a diagrammatic construction in the accommodated state of a camera employing an imaging device according to Embodiment 3. In FIGS. 8A and 8B, the same components as Embodiment 1 are designated by the same numerals. Then, their description is omitted.

The imaging device according to Embodiment 3 is different from the imaging device according to Embodiment 1 in the point that the block escaped in the accommodated state is escaped not in the optical axis AX2 direction of the image side lens unit 6 but in a direction perpendicular to the optical axis AX2.

In transition from the imaging state shown in FIG. 8A to the accommodated state shown in FIG. 8B, the reflective optical element 5 first moves in a direction perpendicular to the optical axis AX2 as indicated by an arrow b4. Then, the lens holding barrel for holding the object side lens unit 4 is retracted along the optical axis AX1 as indicated by an arrow a1 into the space formed by the movement of the reflective optical element 5. As a result, the transition to the accommodated state is completed.

On the contrary, in transition from the accommodated state shown in FIG. 8B to the imaging state shown in FIG. 8A, the lens holding barrel for holding the object side lens unit 4 is drawn out along the optical axis AX1 as indicated by an arrow b1. Then, the reflective optical element 5 moves in a direction perpendicular to the optical axis AX2 as indicated by an arrow b4, and then enters into the space formed by the draw-out of the lens holding barrel for holding the object side lens unit 4.

As a result, the transition to the imaging state is completed.

As described above, according to the lens barrel of Embodiment 3, in addition to the common construction described in Embodiment 1, since the reflective optical element is escaped in a direction perpendicular to the optical axis AX2, the image side lens unit need not be moved at the time of transition to the accommodated state. This simplifies the mechanism, and allows the lens barrel to be constructed compactly with respect to the optical axis AX2 direction.

Embodiment 4

Figure 9A:
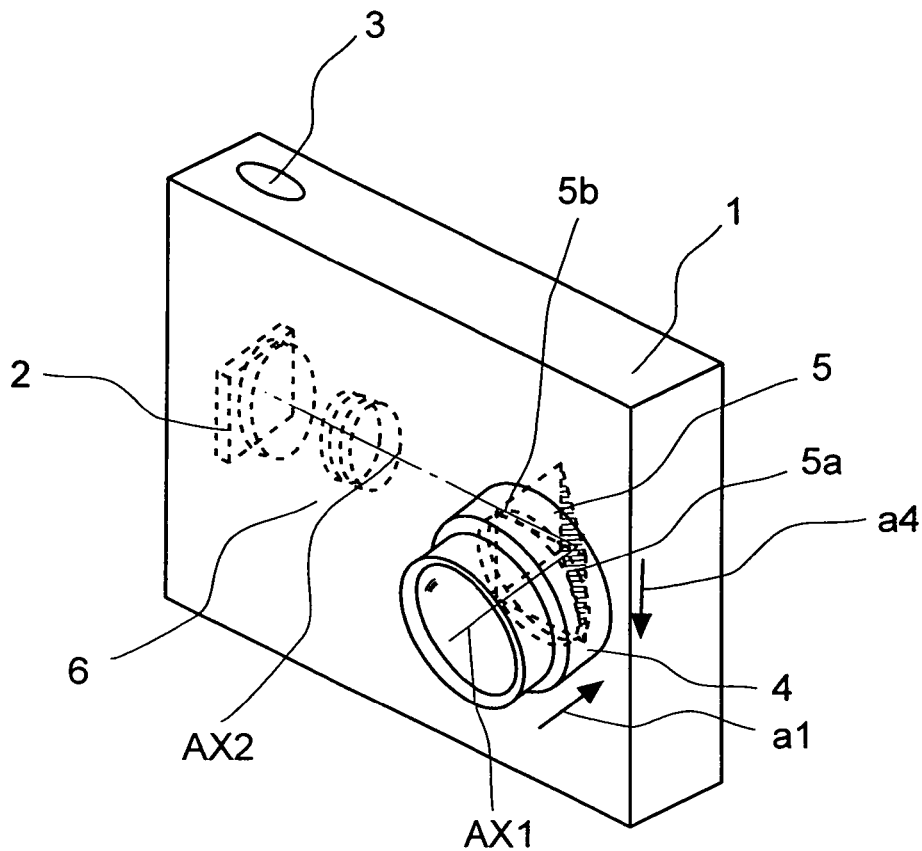
FIG. 9A is a transparent perspective view showing a diagrammatic construction in an imaging state of a camera employing an imaging device according to Embodiment 4.
Figure 9B:
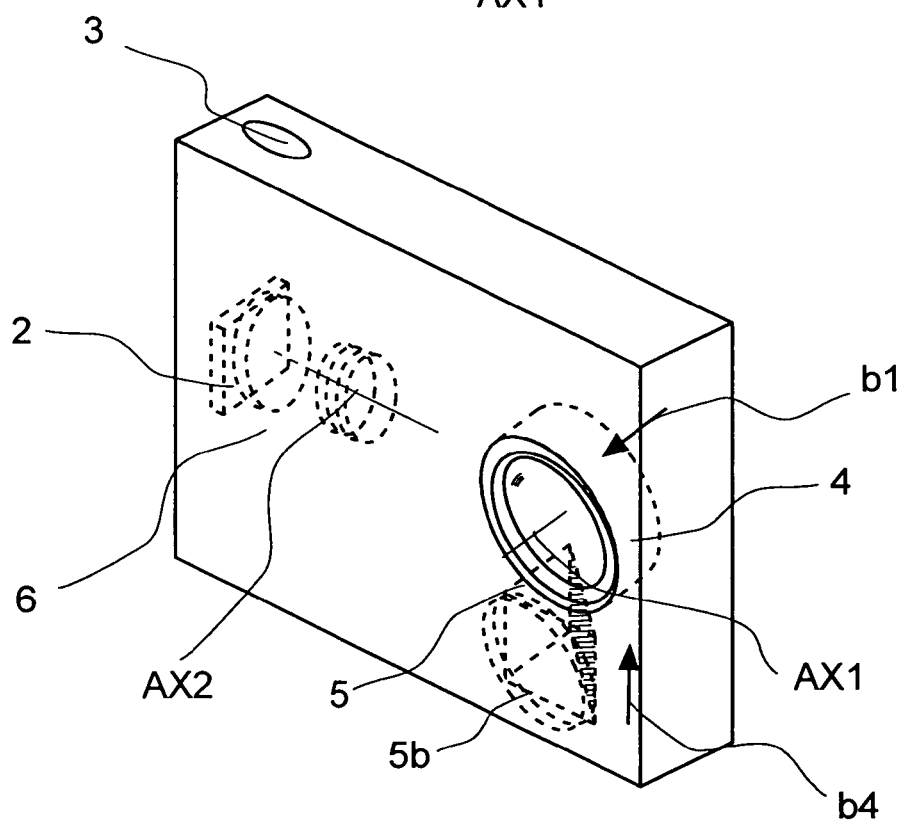
FIG. 9B is a transparent perspective view showing a diagrammatic construction in an accommodated state of a camera employing an imaging device according to Embodiment 4.

FIG. 9A is a transparent perspective view showing a diagrammatic construction in the imaging state of a camera employing an imaging device according to Embodiment 4. FIG. 9B is a transparent perspective view showing a diagrammatic construction in the accommodated state of a camera employing an imaging device according to Embodiment 4. In FIGS. 9A and 9B, the same components as Embodiment 2 are designated by the same numerals. Then, their description is omitted.

The imaging device according to Embodiment 4 is different from the imaging device according to Embodiment 2 in the point that the block escaped in the accommodated state is escaped not in the optical axis AX2 direction of the image side lens unit 6 but in a direction perpendicular to the optical axis AX2.

In transition from the imaging state shown in FIG. 9A to the accommodated state shown in FIG. 9B, the reflective optical element 5 and the lens element 5b first move in a direction perpendicular to the optical axis AX2 as indicated by an arrow a4. Then, the lens holding barrel for holding the object side lens unit 4 is retracted along the optical axis AX1 as indicated by an arrow a1 into the space formed by the movement of the reflective optical element 5 and the lens element 5b. As a result, the transition to the accommodated state is completed.

On the contrary, in transition from the accommodated state shown in FIG. 9B to the imaging state shown in FIG. 9A, the lens holding barrel for holding the object side lens unit 4 is drawn out along the optical axis AX1 as indicated by an arrow b1. Then, the reflective optical element 5 and the lens element 5b move in a direction perpendicular to the optical axis AX2 as indicated by an arrow b4, and then enter into the space formed by the draw-out of the lens holding barrel for holding the object side lens unit 4. As a result, the transition to the imaging state is completed.

As described above, according to the lens barrel of Embodiment 4, in addition to the common construction described in Embodiment 2, since the reflective optical element is escaped in a direction perpendicular to the optical axis AX2, the image side lens unit need not be moved at the time of transition to the accommodated state. This simplifies the mechanism, and allows the lens barrel to be constructed compactly with respect to the optical axis AX2 direction.

Embodiment 5

Figure 10A:
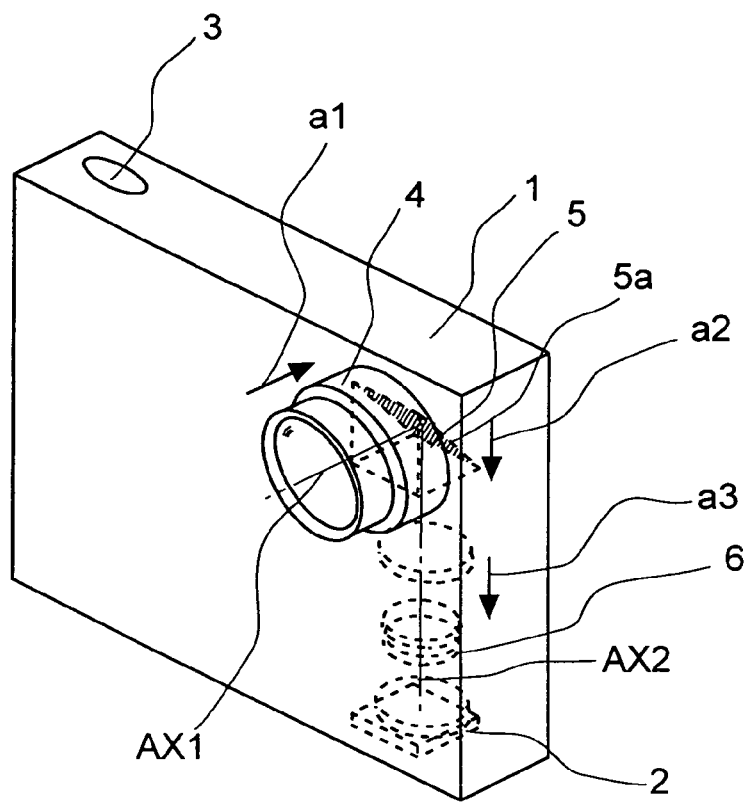
FIG. 10A is a transparent perspective view showing a diagrammatic construction in an imaging state of a camera employing an imaging device according to Embodiment 5.
Figure 10B:
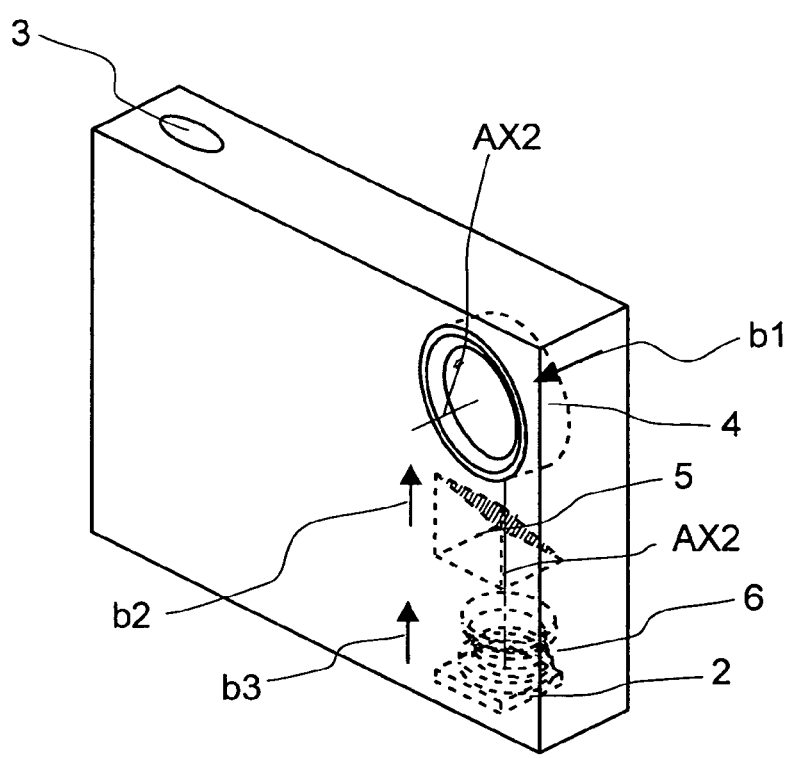
FIG. 10B is a transparent perspective view showing a diagrammatic construction in an accommodated state of a camera employing an imaging device according to Embodiment 5.

FIG. 10A is a transparent perspective view showing a diagrammatic construction in the imaging state of a camera employing an imaging device according to Embodiment 5. FIG. 10B is a transparent perspective view showing a diagrammatic construction in the accommodated state of a camera employing an imaging device according to Embodiment 5. In FIGS. 10A and 10B, the same components as Embodiment 1 are designated by the same numerals. Then, their description is omitted.

The imaging device according to Embodiment 5 is the same as the imaging device according to Embodiments 1 to 4. However, the arrangement direction layout of the optical axis AX2 is different at the time of arranging in the camera. That is, in the camera employing an imaging device according to Embodiments 1 to 4, the optical axis AX2 has been arranged perpendicularly to the stroke direction of the shutter button 3, so that the imaging device has been arranged horizontally. In contrast, in the camera employing an imaging device according to Embodiment 5, the optical axis AX2 is arranged in parallel to the stroke direction of the shutter button 3, so that the imaging device is arranged vertically.

As such, in the imaging device according to Embodiment 5, arrangement flexibility is increased when the imaging device is applied to the camera, and so is the flexibility in designing of a camera.

Embodiments 6 to 12

Figure 11A:
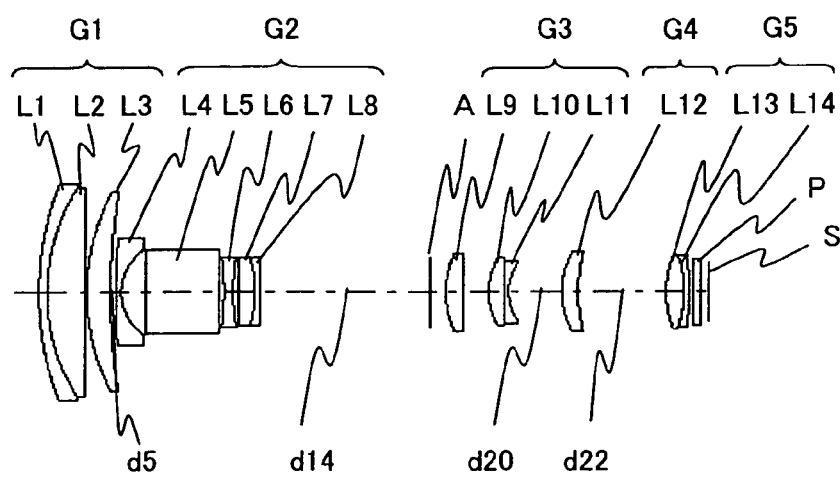
FIGS. 11A to 11C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 6 (Example 1)
Figure 11B:
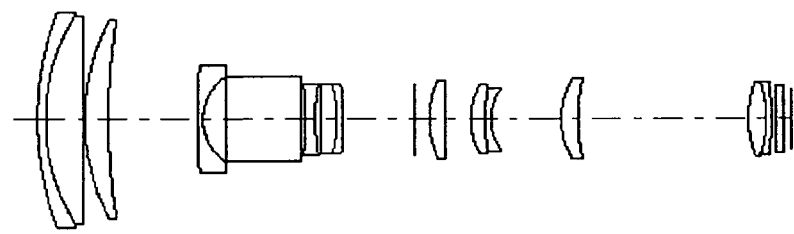
Figure 11C:
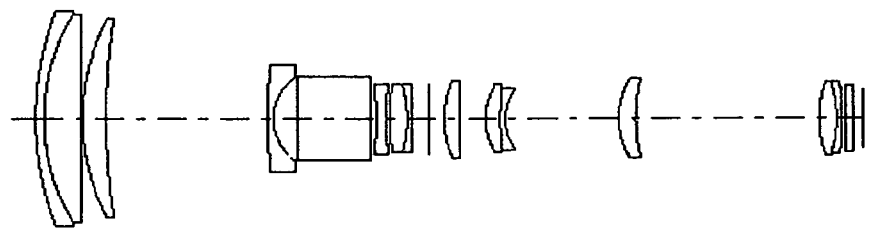
Figure 12A:
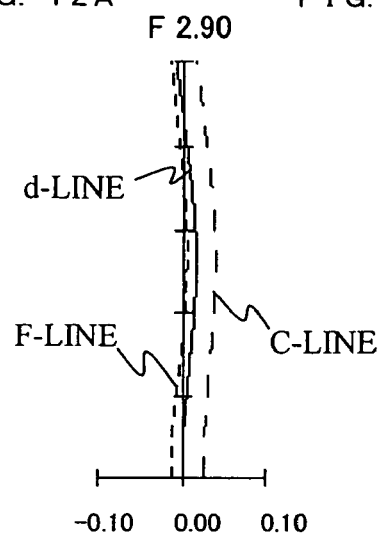
FIGS. 12A to 12I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 1.
Figure 12B:
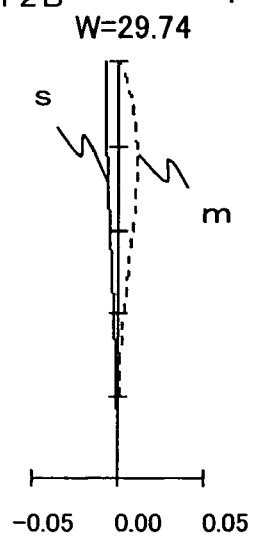
Figure 12C:
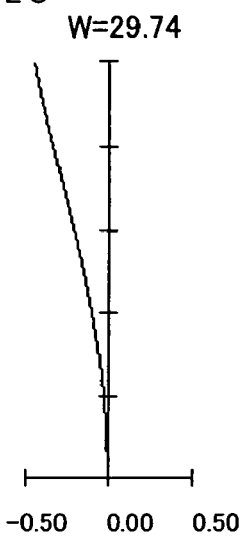
Figure 12D:
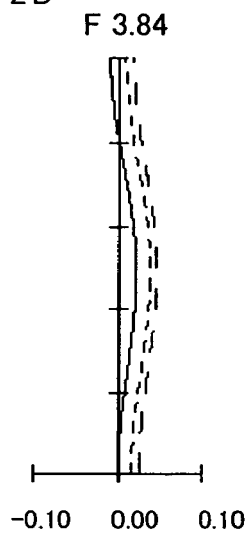
Figure 12E:
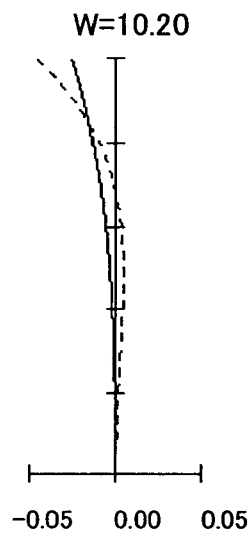
Figure 12F:
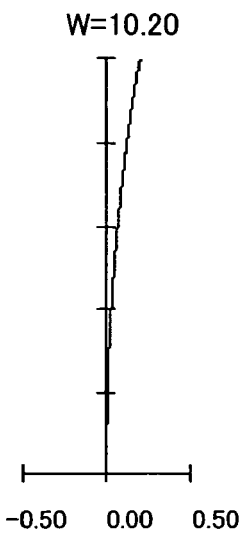
Figure 12G:
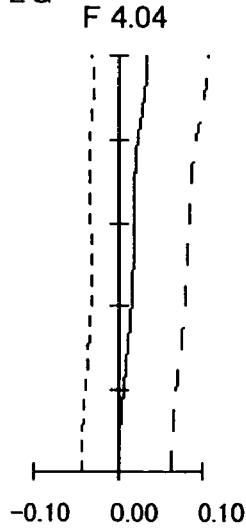
Figure 12H:
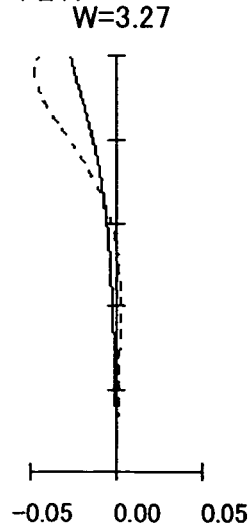
Figure 12I:
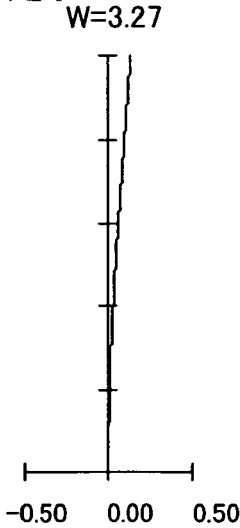
Figure 13A:
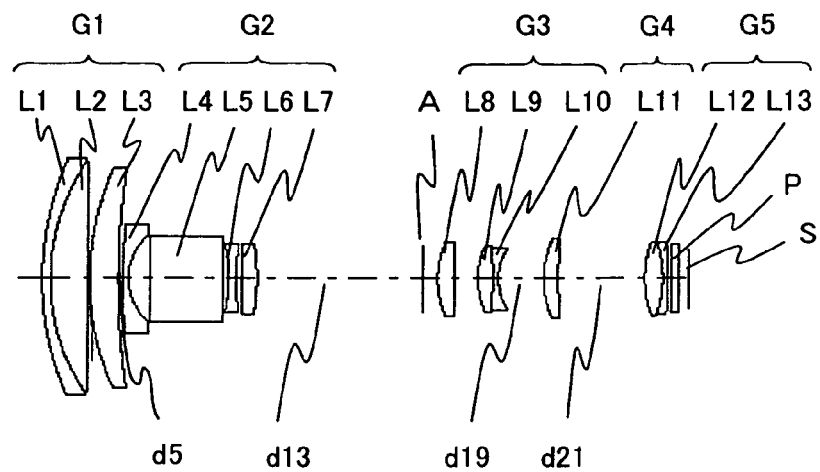
FIGS. 13A to 13C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 7 (Example 2)
Figure 13B:
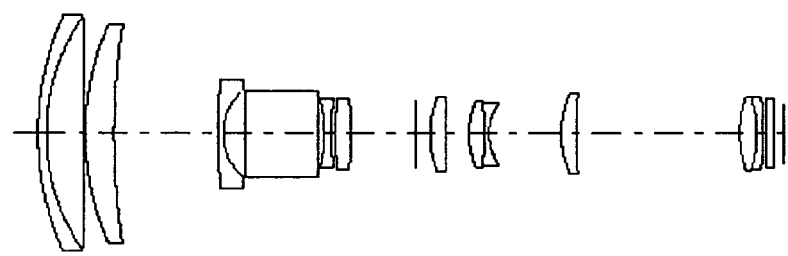
Figure 13C:
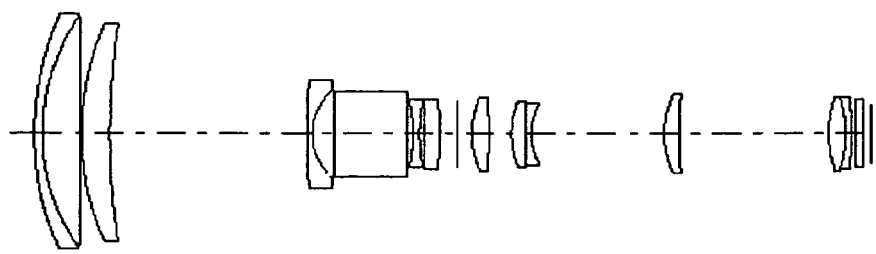
Figure 14A:
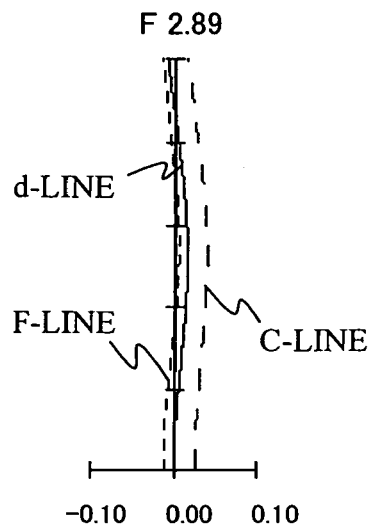
FIGS. 14A to 14I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 2.
Figure 14B:
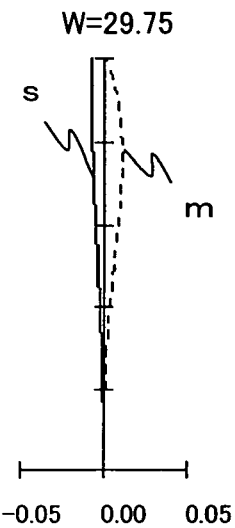
Figure 14C:
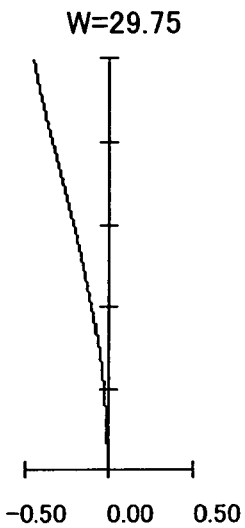
Figure 14D:
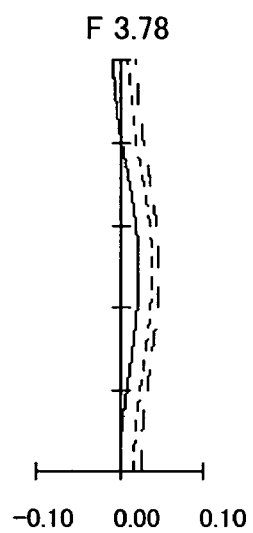
Figure 14E:
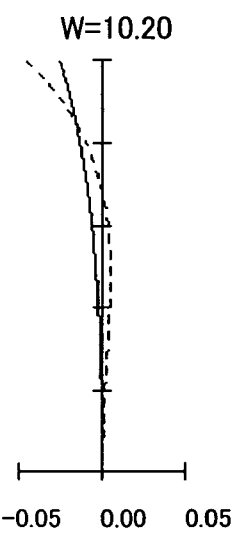
Figure 14F:
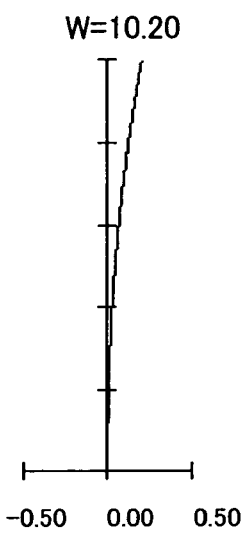
Figure 14G:
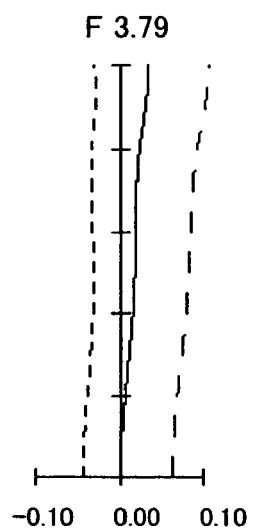
Figure 14H:
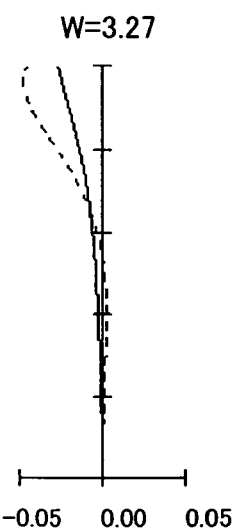
Figure 14I:
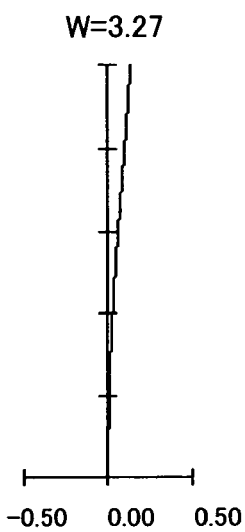
Figure 15A:
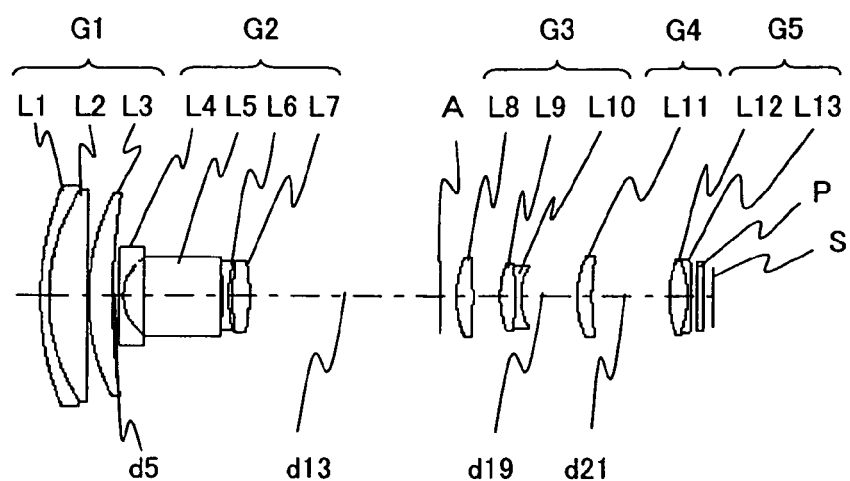
FIGS. 15A to 15C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 8 (Example 3)
Figure 15B:
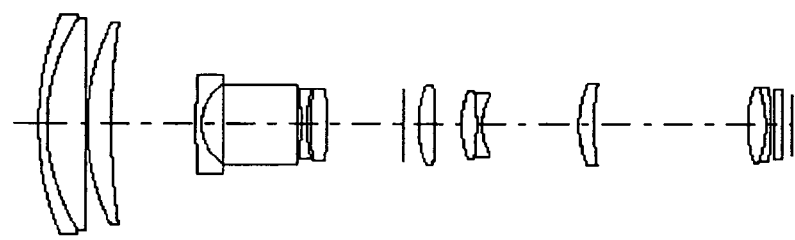
Figure 15C:
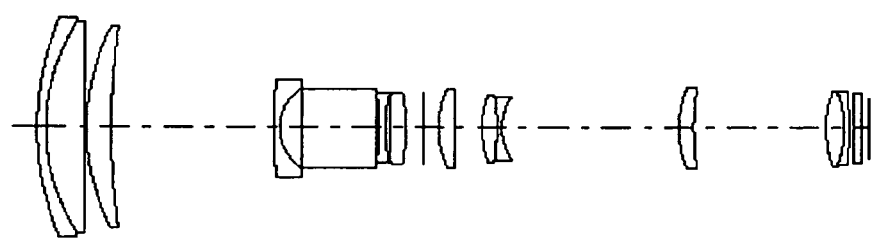
Figure 16A:
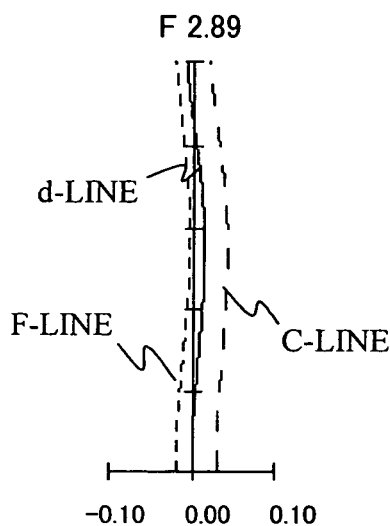
FIGS. 16A to 16I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 3.
Figure 16B:
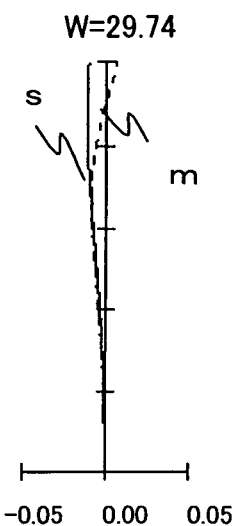
Figure 16C:
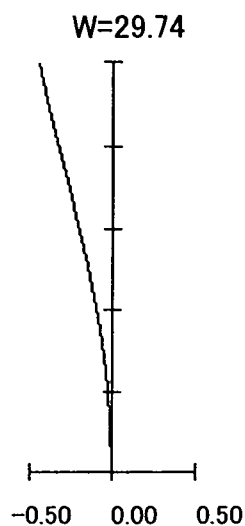
Figure 16D:
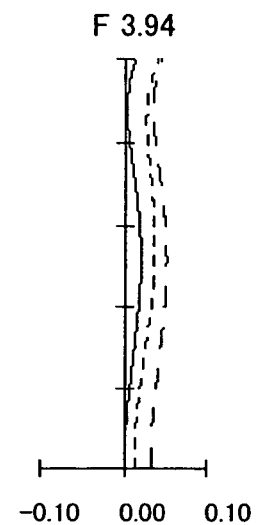
Figure 16E:
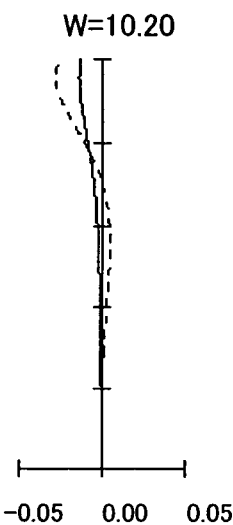
Figure 16F:
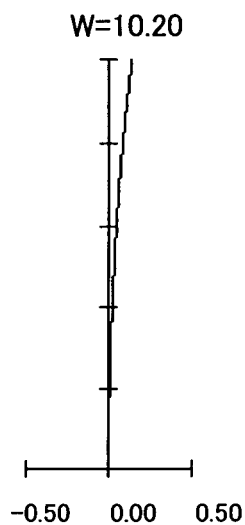
Figure 16G:
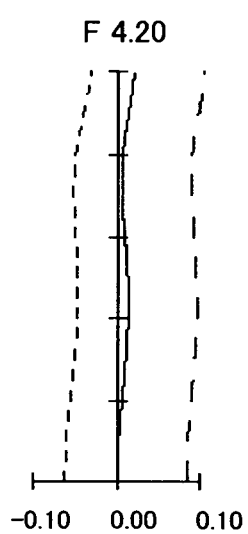
Figure 16H:
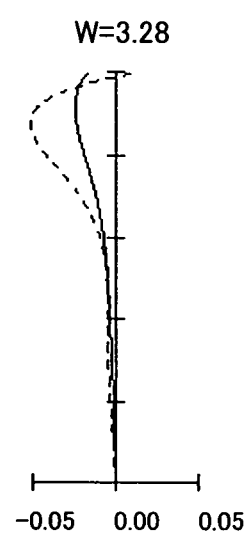
Figure 16I:
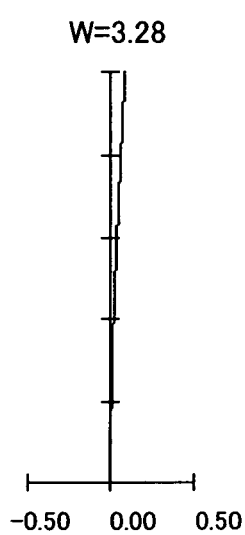
Figure 17A:
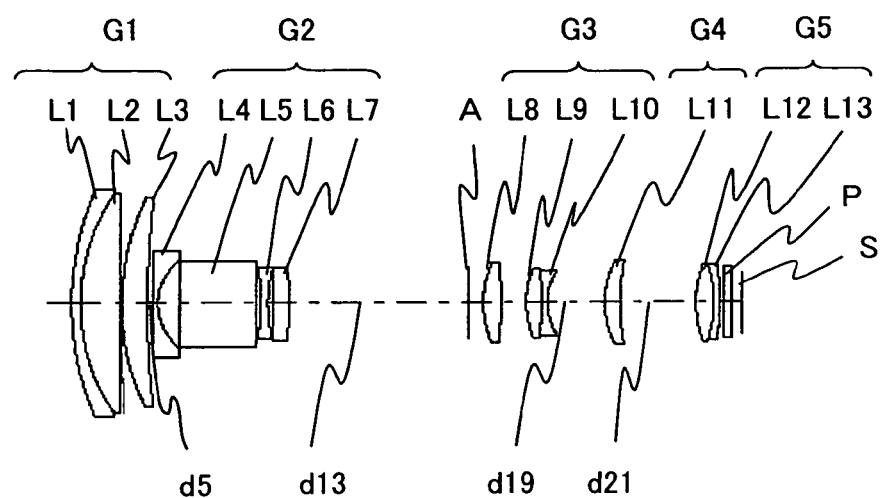
FIGS. 17A to 17C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 9 (Example 4)
Figure 17B:
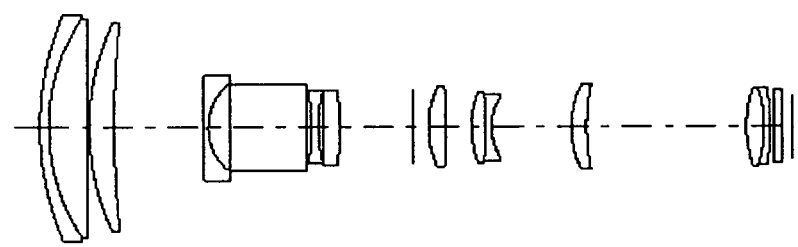
Figure 17C:
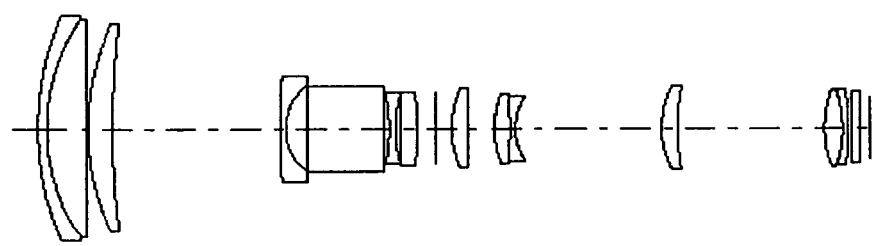
Figure 18A:
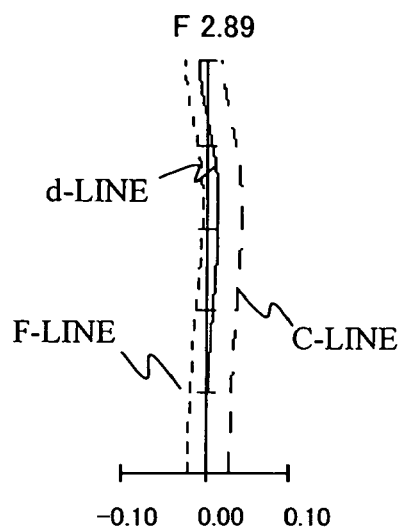
FIGS. 18A to 18I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 4.
Figure 18B:
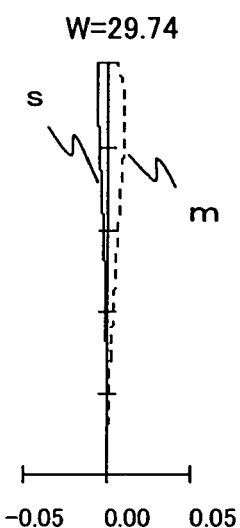
Figure 18C:
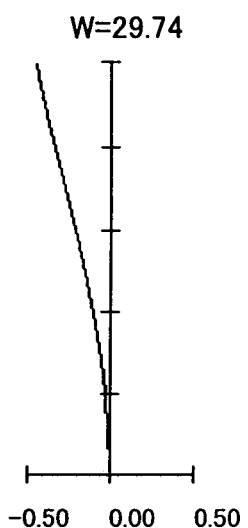
Figure 18D:
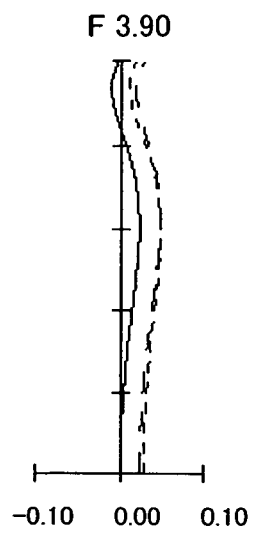
Figure 18E:
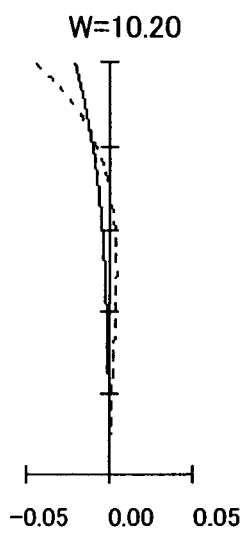
Figure 18F:
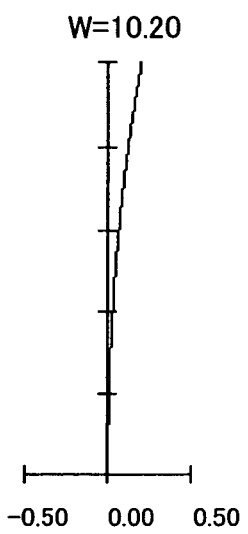
Figure 18G:
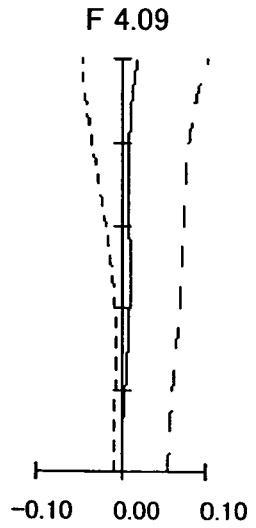
Figure 18H:
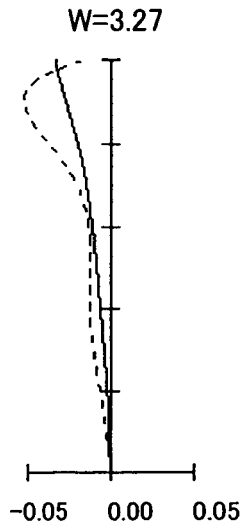
Figure 18I:
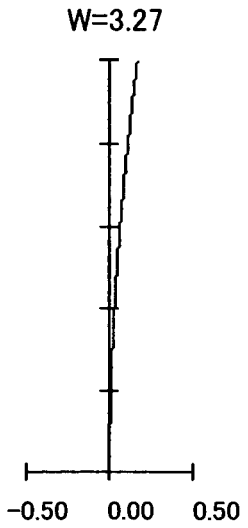
Figure 19A:
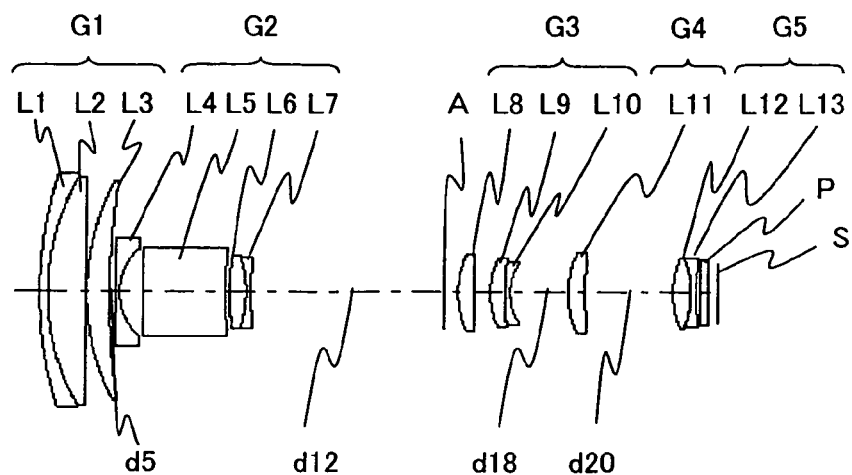
FIGS. 19A to 19C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 10 (Example 5)
Figure 19B:
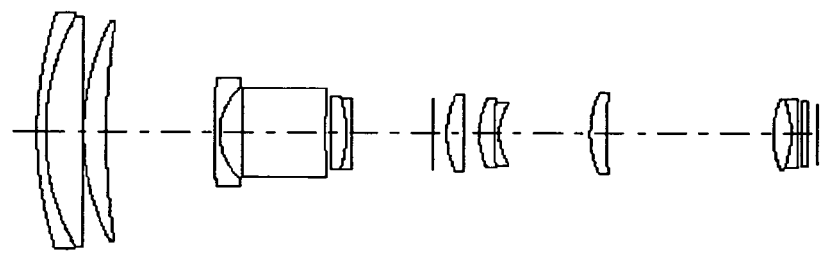
Figure 19C:
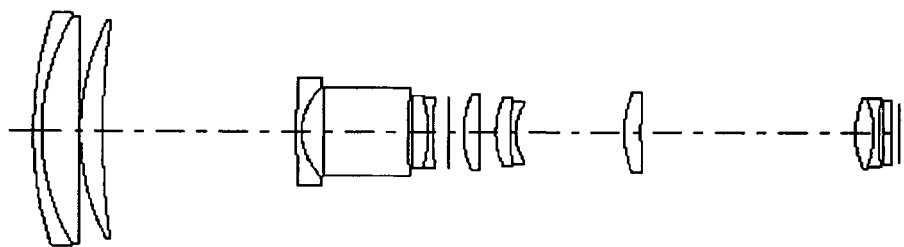
Figure 21A:
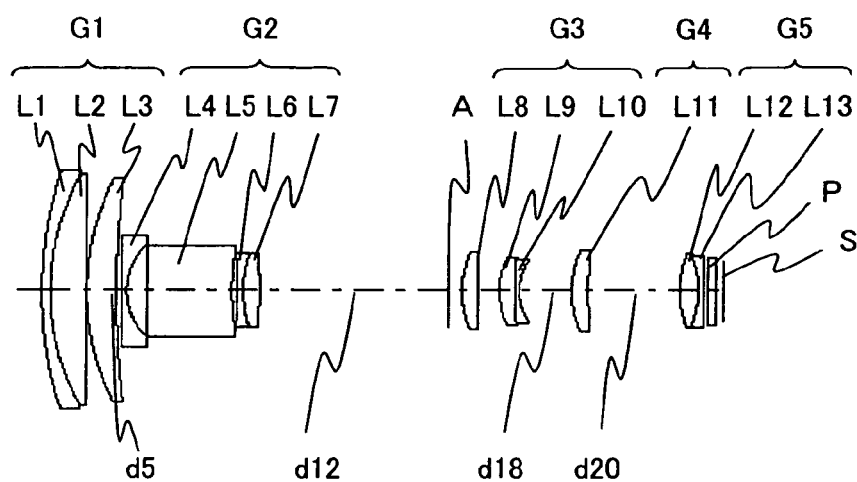
FIGS. 21A to 21C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 11 (Example 6)
Figure 21B:
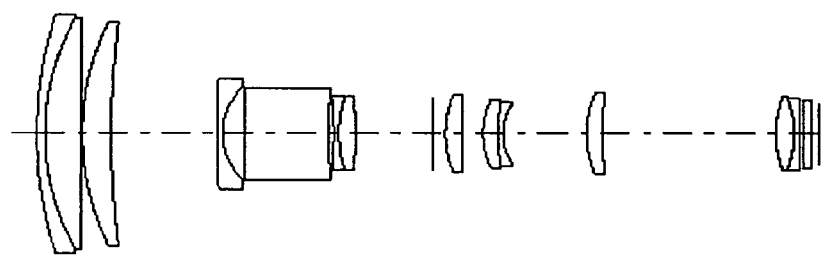
Figure 21C:
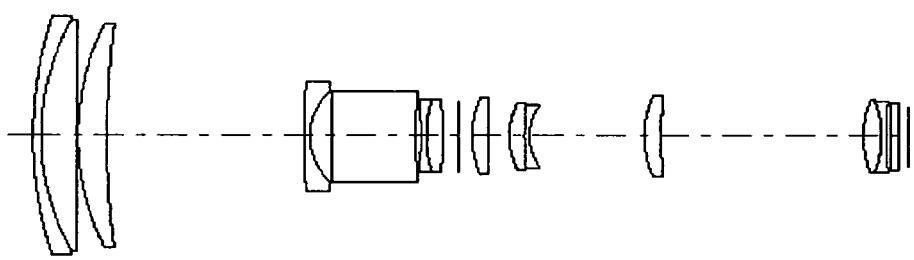
Figure 23A:
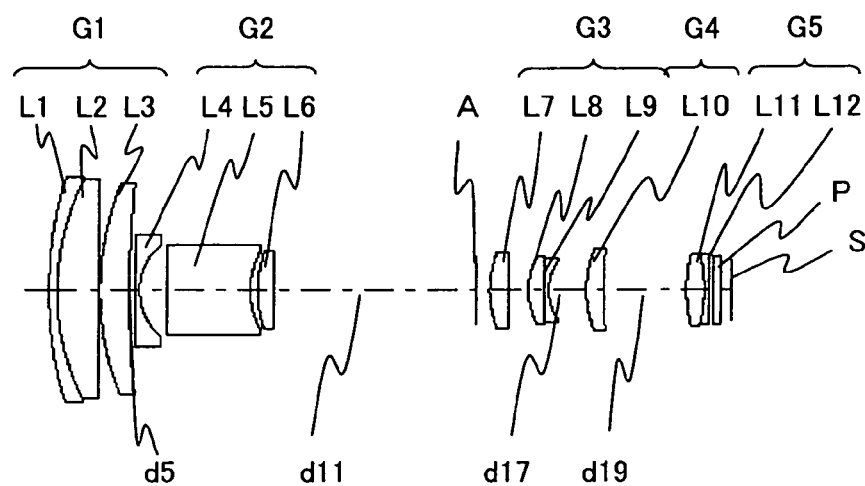
FIGS. 23A to 23C are lens arrangement diagrams showing an infinity in-focus condition at a wide-angle limit, an infinity in-focus condition at a middle position (middle focal length condition), and an infinity in-focus condition at a telephoto limit in a zoom lens system according to Embodiment 12 (Example 7)
Figure 23B:
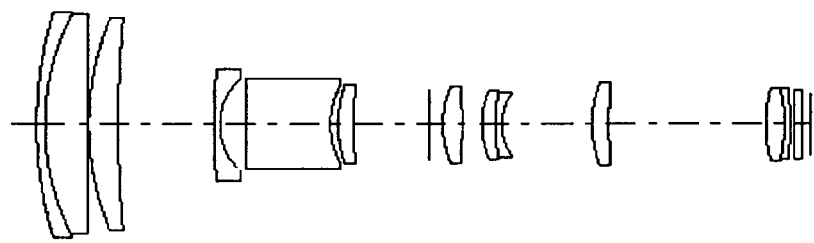
Figure 23C:
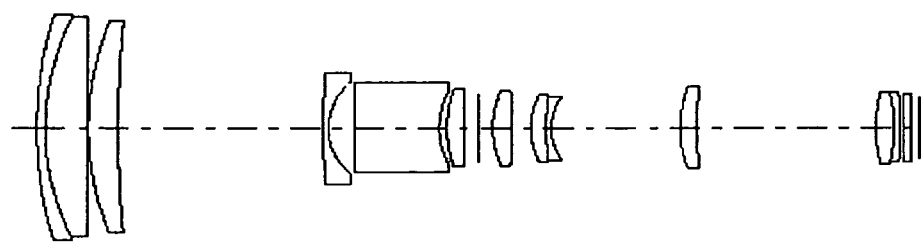
Figure 24A:
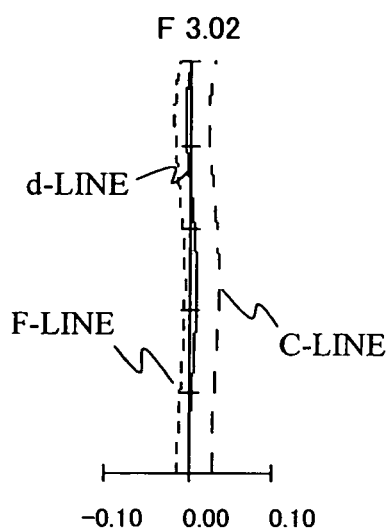
FIGS. 24A to 24I are longitudinal aberration diagrams in an infinity in-focus condition at a wide-angle limit, an infinity in-focus condition at a middle position (middle focal length condition), and an infinity in-focus condition at a telephoto limit in a zoom lens system according to Example 7.
Figure 24B:
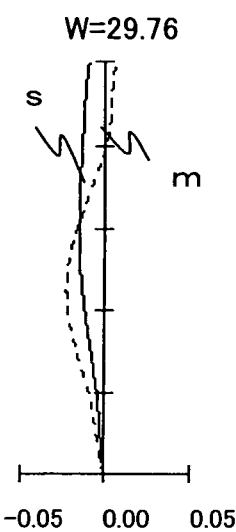
Figure 24C:
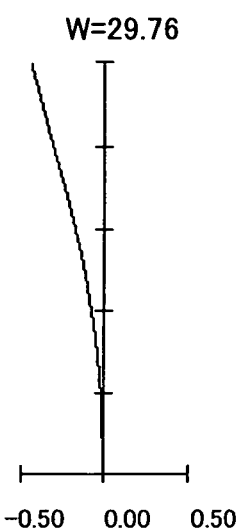
Figure 24D:
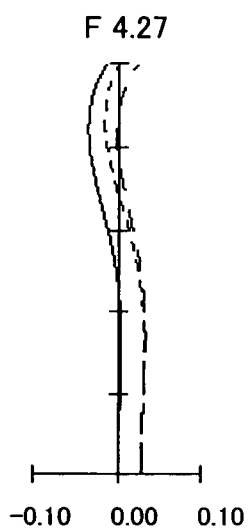
Figure 24E:
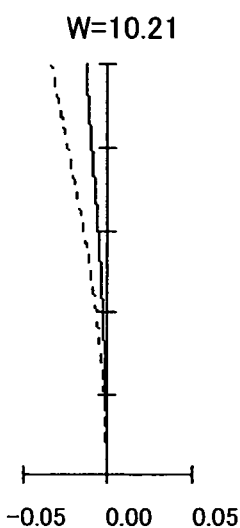
Figure 24F:
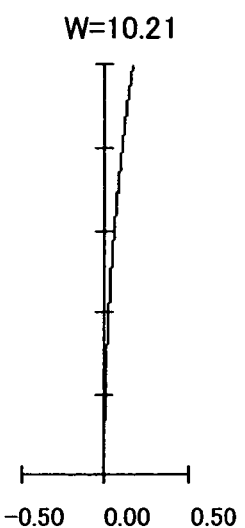
Figure 24G:
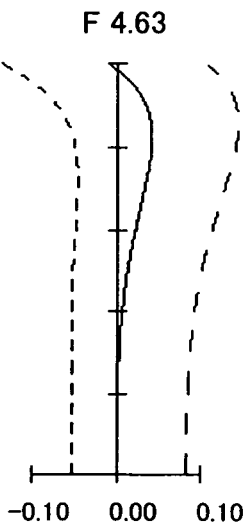
Figure 24H:
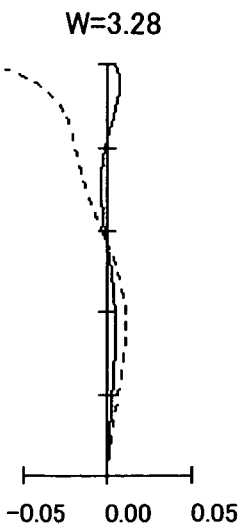
Figure 24I:
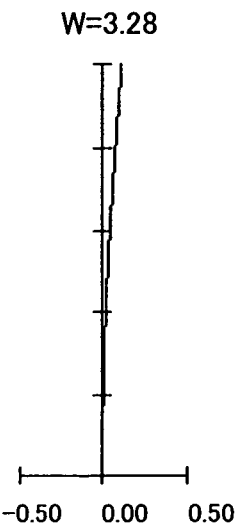

The zoom lens system applicable to the imaging device of Embodiments 1 to 5 is described below in further detail with reference to the drawings. FIGS. 11A to 11C are lens arrangement diagrams of a zoom lens system according to Embodiment 6. FIGS. 13A to 13C are lens arrangement diagrams of a zoom lens system according to Embodiment 7. FIGS. 15A to 15C are lens arrangement diagrams of a zoom lens system according to Embodiment 8. FIGS. 17A to 17C are lens arrangement diagrams of a zoom lens system according to Embodiment 9. FIGS. 19A to 19C are lens arrangement diagrams of a zoom lens system according to Embodiment 10. FIGS. 21A to 21C are lens arrangement diagrams of a zoom lens system according to Embodiment 11. FIGS. 23A to 23C are lens arrangement diagrams of a zoom lens system according to Embodiment 12. FIGS. 11A, 13A, 15A, 17A, 19A, 21A and 23A show the lens construction at the wide-angle limit (the shortest focal length condition: focal length $f_W$). FIGS. 11B, 13B, 15B, 17B, 19B, 21B and 23B show the lens construction at the middle position (the middle focal length condition: focal length $f_M = \sqrt{(f_W * f_T)}$). FIGS. 11C, 13C, 15C, 17C, 19C, 21C and 23C show the lens construction at the telephoto limit (the longest focal length condition: focal length $f_T$).

The zoom lens system according to each embodiment, in order from the object side to the image side, comprises: a first lens unit G1 having positive optical power; a second lens unit G2 having negative optical power; a diaphragm A; a third lens unit G3 having positive optical power; a fourth lens unit G4 having positive optical power and a fifth lens unit G5 having positive optical power. Here, in each embodiment, the reflective optical prism L5 is a prism having a reflecting surface in the inside. In the description, the position of the reflecting surface is omitted. Further, in each figure, a straight line drawn on the right most side indicates the position of an image surface S. On its object side, a plane parallel plate P such as an optical low-pass filter, a face plate of the image sensor or the like is provided. In the zoom lens system according to Embodiments 6 to 12, these lens units are arranged in a desired optical power construction, so that size reduction is achieved in the entire lens system in a state that a high magnification variation ratio is achieved and that the required optical performance is satisfied.

In the zoom lens system according to each embodiment, the first lens unit G1, in order from the object side to the image side, comprises: a negative meniscus first lens element L1 with the convex surface facing the object side; a planer-convex second lens element L2 with the convex surface facing the object side and a positive meniscus third lens element L3 with the convex surface facing the object side. In the zoom lens system according to each embodiment, the first lens element L1 and the second lens element L2 are cemented with each other.

As shown in FIGS. 11A to 11C, in the zoom lens system according to Embodiment 6, the second lens unit G2, in order from the object side to the image side, comprises: a negative meniscus fourth lens element L4 with the convex surface facing the object side; a reflective optical prism L5 whose incident and exit surfaces are both plane; a bi-concave sixth lens element L6; a bi-convex seventh lens element L7 and a negative meniscus eighth lens element L8 with the convex surface facing the image side. In the zoom lens system according to Embodiment 6, the seventh lens element L7 and the eighth lens element L8 are cemented with each other.

In the zoom lens system according to Embodiment 6, the third lens unit G3, in order from the object side to the image side, comprises: a positive meniscus ninth lens element L9 with the convex surface facing the object side; a positive meniscus tenth lens element L10 with the convex surface facing the object side and a negative meniscus eleventh lens element L11 with the concave surface facing the image side. Among these, the tenth lens element L10 and the eleventh lens element L11 are cemented with each other. Further, in the zoom lens system according to Embodiment 6, the fourth lens unit G4 comprises solely a positive meniscus twelfth lens element L12 with the convex surface facing the object side. Further, in the zoom lens system according to Embodiment 6, the fifth lens unit G5, in order from the object side to the image side, comprises: a bi-convex thirteenth lens element L13 and a negative meniscus fourteenth lens element L14 with the convex surface facing the image side. The thirteenth lens element L13 and the fourteenth lens element L14 are cemented with each other.

In the zoom lens system according to Embodiment 6, in zooming from the wide-angle limit to the telephoto limit, the first lens unit G1 and the third lens unit G3 move to the object side, while the fourth lens unit G4 moves to the object side with expanding the interval with the third lens unit G3. Further, in the zoom lens system according to Embodiment 6, in zooming from the wide-angle limit to the telephoto limit, the second lens unit G2 and the fifth lens unit G5 are fixed relative to the image surface.

As shown in FIGS. 13A to 13C, in the zoom lens system according to Embodiment 7, the second lens unit G2, in order from the object side to the image side, comprises: a negative meniscus fourth lens element L4 with the convex surface facing the object side; a reflective optical prism L5 whose incident and exit surfaces are both plane; a bi-concave sixth lens element L6 and a bi-convex seventh lens element L7.

In the zoom lens system according to Embodiment 7, the third lens unit G3, in order from the object side to the image side, comprises: a bi-convex eighth lens element L8; a bi-convex ninth lens element L9 and a bi-concave tenth lens element L10. Among these, the ninth lens element L9 and the tenth lens element L10 are cemented with each other. Further, in the zoom lens system according to Embodiment 7, the fourth lens unit G4 comprises solely a positive meniscus eleventh lens element L11 with the convex surface facing the object side. Further, in the zoom lens system according to Embodiment 7, the fifth lens unit G5, in order from the object side to the image side, comprises: a bi-convex twelfth lens element L12 and a negative meniscus thirteenth lens element L13 with the convex surface facing the image side. The twelfth lens element L12 and the thirteenth lens element L13 are cemented with each other.

In the zoom lens system according to Embodiment 7, in zooming from the wide-angle limit to the telephoto limit, the first lens unit G1 and the third lens unit G3 move to the object side, while the fourth lens unit G4 moves with locus of a convex to the object side with changing the interval with the third lens unit G3. Further, in the zoom lens system according to Embodiment 7, in zooming from the wide-angle limit to the telephoto limit, the second lens unit G2 and the fifth lens unit G5 are fixed relative to the image surface.

As shown in FIGS. 15A to 15C, in the zoom lens system according to Embodiment 8, the second lens unit G2, in order from the object side to the image side, comprises: a negative meniscus fourth lens element L4 with the convex surface facing the object side; a reflective optical prism L5 whose incident and exit surfaces are both plane; a bi-concave sixth lens element L6 and a bi-convex seventh lens element L7.

In the zoom lens system according to Embodiment 8, the third lens unit G3, in order from the object side to the image side, comprises: a bi-convex eighth lens element L8; a bi-convex ninth lens element L9 and a bi-concave tenth lens element L10. Among these, the ninth lens element L9 and the tenth lens element L10 are cemented with each other. Further, in the zoom lens system according to Embodiment 8, the fourth lens unit G4 comprises solely a positive meniscus eleventh lens element L11 with the convex surface facing the object side. Further, in the zoom lens system according to Embodiment 8, the fifth lens unit G5, in order from the object side to the image side, comprises: a bi-convex twelfth lens element L12 and a negative meniscus thirteenth lens element L13 with the convex surface facing the image side. The twelfth lens element L12 and the thirteenth lens element L13 are cemented with each other.

In the zoom lens system according to Embodiment 8, in zooming from the wide-angle limit to the telephoto limit, the first lens unit G1 and the third lens unit G3 move to the object side, while the fourth lens unit G4 moves with locus of a convex to the object side with changing the interval with the third lens unit G3. Further, in the zoom lens system according to Embodiment 8, in zooming from the wide-angle limit to the telephoto limit, the second lens unit G2 and the fifth lens unit G5 are fixed relative to the image surface.

As shown in FIGS. 17A to 17C, in the zoom lens system according to Embodiment 9, the second lens unit G2, in order from the object side to the image side, comprises: a negative meniscus fourth lens element L4 with the convex surface facing the object side; a reflective optical prism L5 whose incident and exit surfaces are both plane; a bi-concave sixth lens element L6 and a bi-convex seventh lens element L7.

In the zoom lens system according to Embodiment 9, the third lens unit G3, in order from the object side to the image side, comprises: a bi-convex eighth lens element L8; a bi-convex ninth lens element L9 and a bi-concave tenth lens element L10. Among these, the ninth lens element L9 and the tenth lens element L10 are cemented with each other. Further, in the zoom lens system according to Embodiment 9, the fourth lens unit G4 comprises solely a positive meniscus eleventh lens element L11 with the convex surface facing the object side. Further, in the zoom lens system according to Embodiment 9, the fifth lens unit G5, in order from the object side to the image side, comprises: a bi-convex twelfth lens element L12 and a negative meniscus thirteenth lens element L13 with the convex surface facing the image side. The twelfth lens element L12 and the thirteenth lens element L13 are cemented with each other.

In the zoom lens system according to Embodiment 9, in zooming from the wide-angle limit to the telephoto limit, the first lens unit G1 and the third lens unit G3 move to the object side, while the fourth lens unit G4 moves with locus of a convex to the object side with changing the interval with the third lens unit G3. Further, in the zoom lens system according to Embodiment 9, in zooming from the wide-angle limit to the telephoto limit, the second lens unit G2 and the fifth lens unit G5 are fixed relative to the image surface.

As shown in FIGS. 19A to 19C, in the zoom lens system according to Embodiment 10, the second lens unit G2, in order from the object side to the image side, comprises: a negative meniscus fourth lens element L4 with the convex surface facing the object side; a reflective optical prism L5 having a plane incident surface and a concave exit surface; a bi-convex sixth lens element L6 and a bi-concave seventh lens element L7. Among these, the sixth lens element L6 and the seventh lens element L7 are cemented with each other.

In the zoom lens system according to Embodiment 10, the third lens unit G3, in order from the object side to the image side, comprises: a positive meniscus eighth lens element L8 with the convex surface facing the object side; a positive meniscus ninth lens element L9 with the convex surface facing the object side and a negative meniscus tenth lens element L10 with the concave surface facing the image side. Among these, the ninth lens element L9 and the tenth lens element L10 are cemented with each other. Further, in the zoom lens system according to Embodiment 10, the fourth lens unit G4 comprises solely a positive meniscus eleventh lens element L11 with the convex surface facing the object side. Further, in the zoom lens system according to Embodiment 10, the fifth lens unit G5, in order from the object side to the image side, comprises: a bi-convex twelfth lens element L12 and a negative meniscus thirteenth lens element L13 with the convex surface facing the image side. The twelfth lens element L12 and the thirteenth lens element L13 are cemented with each other.

In the zoom lens system according to Embodiment 10, in zooming from the wide-angle limit to the telephoto limit, the first lens unit G1 and the third lens unit G3 move to the object side, while the fourth lens unit G4 moves to the object side with changing the interval with the third lens unit G3. Further, in the zoom lens system according to Embodiment 10, in zooming from the wide-angle limit to the telephoto limit, the second lens unit G2 and the fifth lens unit G5 are fixed relative to the image surface.

As shown in FIGS. 21A to 21C, in the zoom lens system according to Embodiment 11, the second lens unit G2, in order from the object side to the image side, comprises: a negative meniscus fourth lens element L4 with the convex surface facing the object side; a reflective optical prism L5 having a plane incident surface and a concave exit surface; a bi-concave sixth lens element L6 and a bi-convex seventh lens element L7. Among these, the sixth lens element L6 and the seventh lens element L7 are cemented with each other.

In the zoom lens system according to Embodiment 11, the third lens unit G3, in order from the object side to the image side, comprises: a positive meniscus eighth lens element L8 with the convex surface facing the object side; a positive meniscus ninth lens element L9 with the convex surface facing the object side and a negative meniscus tenth lens element L10 with the concave surface facing the image side. Among these, the ninth lens element L9 and the tenth lens element L10 are cemented with each other. Further, in the zoom lens system according to Embodiment 11, the fourth lens unit G4 comprises solely a positive meniscus eleventh lens element L11 with the convex surface facing the object side. Further, in the zoom lens system according to Embodiment 11, the fifth lens unit G5, in order from the object side to the image side, comprises: a bi-convex twelfth lens element L12 and a negative meniscus thirteenth lens element L13 with the convex surface facing the image side. The twelfth lens element L12 and the thirteenth lens element L13 are cemented with each other.

In the zoom lens system according to Embodiment 11, in zooming from the wide-angle limit to the telephoto limit, the first lens unit G1 and the third lens unit G3 move to the object side, while the fourth lens unit G4 moves to the object side with changing the interval with the third lens unit G3. Further, in the zoom lens system according to Embodiment 11, in zooming from the wide-angle limit to the telephoto limit, the second lens unit G2 and the fifth lens unit G5 are fixed relative to the image surface.

As shown in FIGS. 23A to 23C, in the zoom lens system according to Embodiment 12, the second lens unit G2, in order from the object side to the image side, comprises: a negative meniscus fourth lens element L4 with the convex surface facing the object side; a reflective optical prism L5 having a plane incident surface and a concave exit surface and a positive meniscus sixth lens element L6 with the convex surface facing the object side.

In the zoom lens system according to Embodiment 12, the third lens unit G3, in order from the object side to the image side, comprises: a bi-convex seventh lens element L7; a positive meniscus eighth lens element L8 with the convex surface facing the object side and a negative meniscus ninth lens element L9 with the concave surface facing the image side. Among these, the eighth lens element L8 and the ninth lens element L9 are cemented with each other. Further, in the zoom lens system according to Embodiment 12, the fourth lens unit G4 comprises solely a positive meniscus tenth lens element L10 with the convex surface facing the object side. Further, in the zoom lens system according to Embodiment 12, the fifth lens unit G5, in order from the object side to the image side, comprises: a bi-convex eleventh lens element L11 and a negative meniscus twelfth lens element L12 with the convex surface facing the image side. The eleventh lens element L11 and the twelfth lens element L12 are cemented with each other.

In the zoom lens system according to Embodiment 12, in zooming from the wide-angle limit to the telephoto limit, the first lens unit G1 and the third lens unit G3 move to the object side, while the fourth lens unit G4 moves to the object side with changing the interval with the third lens unit G3. Further, in the zoom lens system according to Embodiment 12, in zooming from the wide-angle limit to the telephoto limit, the second lens unit G2 and the fifth lens unit G5 are fixed relative to the image surface.

Various conditions are described below that are to be satisfied by a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12. Here, a plurality of conditions to be satisfied is set forth for the zoom lens system according to each embodiment. The construction that satisfies all the conditions is most desirable for the zoom lens system. However, when an individual condition is satisfied, a zoom lens system providing the corresponding effect can be obtained.

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (1) is satisfied;

$$0.50 < \Sigma D / \Sigma d_{AIR} < 1.00 \tag{1}$$

where, $\Sigma D$ is the optical axial total thickness of each lens unit located between the second lens unit and a lens unit that is located on the image side relative to the second lens unit and that does not move in an optical axis direction in zooming, and $\Sigma d_{AIR}$ is the optical axial total air space of the each lens unit located between the second lens unit and a lens unit that is located on the image side relative to the second lens unit and that does not move in the optical axis direction in zooming.

The condition (1) relates to the thickness of the imaging device in the accommodated state. When the value exceeds the upper limit of the condition (1), the escaped optical elements become large, and so does the imaging device. In contrast, when the value goes below the lower limit of the condition (1), sufficient compensation of aberration becomes difficult to be achieved in the entire zoom lens system.

When the range specified by at least one of the following conditions (1)' and (1)" is satisfied further, the above effect is achieved more successfully.

$$0.55 < \Sigma D / \Sigma d_{AIR} \tag{1}'$$

$$\Sigma D / \Sigma d_{AIR} < 0.80 \tag{1}''$$

When a zoom lens system, in order from the object side to the image side, comprising: a first lens unit having positive optical power and a second lens unit having negative optical power, wherein the second lens unit is provided with a reflecting surface inside thereof, as the zoom lens system according to Embodiments 6 to 12, is applied to an imaging device in which in the accommodated state, part of the optical elements located on the object side relative to the reflective optical element is escaped from the position in the imaging state, as in Embodiments 1, 3 and 5, the zoom lens system is preferred to satisfy the following condition (2);

$$0.60 < D_1 / D_2 < 0.85 \tag{2}$$

where;

$D_1$ is the optical axial distance from a surface on the most object side to a surface on the most image side among all the optical elements located on the object side relative to the optical elements escaped in accommodating, and $D_2$ is the optical axial distance from a surface on the most object side to a surface on the most image side among the optical elements escaped in accommodating.

The condition (2) relates to the thickness of the imaging device in the accommodated state. When the value exceeds the upper limit of the condition (2), the optical elements located on the object side become larger than the escaped optical elements. This causes an increase in the thickness of the imaging device. In contrast, when the value goes below the lower limit of the condition (2), the escaped optical elements become large, and so dose the space at the escape position. This causes an increase in the width or the height of the imaging device.

When the range specified by at least one of the following conditions (2)' and (2)" is satisfied further, the above effect is achieved more successfully.

$$0.68 < D_1 / D_2 \tag{2}'$$

$$D_1 / D_2 < 0.75 \tag{2}''$$

When a zoom lens system, in order from the object side to the image side, comprises: a first lens unit having positive optical power and a second lens unit having negative optical power, wherein the second lens unit is provided with a reflecting surface inside thereof, as the zoom lens system according to Embodiments 6 to 12, is applied to an imaging device in which in the accommodated state, all the optical elements located on the object side relative to the reflective optical element are escaped from the position in the imaging state, as in Embodiments 2 and 4, the zoom lens system is preferred to satisfy the following condition (3);

$$0.45 < D_1' / D_2'' < 0.65 \tag{3}$$

where, $D_1'$ is the optical axial distance from a surface on the most object side to a surface on the most image side among all the optical elements located on the object side relative to the optical elements escaped in accommodating, and $D_2'$ is the optical axial distance from a surface on the most object side to a surface on the most image side among the optical elements escaped in accommodating.

The condition (3) relates to the thickness of the imaging device in the accommodated state. When the value exceeds the upper limit of the condition (3), the optical elements located on the object side become larger than the escaped optical elements. This causes an increase in the thickness of the imaging device. In contrast, when the value goes below the lower limit of the condition (3), the escaped optical elements become large, and so dose the space at the escape position. This causes an increase in the width or the height of the imaging device.

When the range specified by at least one of the following conditions (3)' and (3)" is satisfied further, the above effect is achieved more successfully.

$$0.52 < D_1' / D_2' \tag{3}'$$

$$D_1' / D_2' < 0.56 \tag{3}''$$

When a zoom lens system, in order from the object side to the image side, comprising: a first lens unit having positive optical power; and a second lens unit having negative optical power, wherein the second lens unit is provided with a reflecting surface inside thereof, as the zoom lens system according to Embodiments 6 to 12, is applied to an imaging device in which in the accommodated state, part of the optical elements located on the object side relative to the reflective optical element is escaped from the position in the imaging state, as in Embodiments 1, 3 and 5, the zoom lens system is preferred to satisfy the following condition (4);

$$2.00 < D_1 / Iv < 2.80 \tag{4}$$

where, $D_1$ is the optical axial distance from a surface on the most object side to a surface on the most image side among all the optical elements located on the object side relative to the optical elements escaped in accommodating, and Iv is a length of the image sensor in the short side direction.

The condition (4) relates to the thickness of the imaging device in the accommodated state. When the value exceeds the upper limit of the condition (4), the optical elements located on the object side become larger than the escaped optical elements. This causes an increase in the thickness of the imaging device. In contrast, when the value goes below the lower limit of the condition (4), aberration fluctuation becomes large in the entire zoom lens system. This situation is undesirable.

When the range specified by at least one of the following conditions (4)' and (4)" is satisfied further, the above effect is achieved more successfully.

$$2.30 < D_1/Iv \quad (4)'$$

$$D_1/Iv < 2.60 \quad (4)''$$

When a zoom lens system, in order from the object side to the image side, comprises: a first lens unit having positive optical power and a second lens unit having negative optical power, wherein the second lens unit is provided with a reflecting surface inside thereof, as the zoom lens system according to Embodiments 6 to 12, is applied to an imaging device in which in the accommodated state, all the optical elements located on the object side relative to the reflective optical element are escaped from the position in the imaging state, as in Embodiments 2 and 4, the zoom lens system is preferred to satisfy the following condition (5);

$$2.00 < D_1'/Iv < 2.80 \quad (5)$$

where, $D_1'$ is the optical axial distance from a surface on the most object side to a surface on the most image side among all the optical elements located on the object side relative to the optical elements escaped in accommodating, and Iv is the length of the image sensor in the short side direction.

The condition (5) relates to the thickness of the imaging device in the accommodated state. When the value exceeds the upper limit of the condition (5), the optical elements located on the object side become larger than the escaped optical elements. This causes an increase in the thickness of the imaging device. In contrast, when the value goes below the lower limit of the condition (5), aberration fluctuation becomes large in the entire zoom lens system. This situation is undesirable.

When the range specified by at least one of the following conditions (5)' and (5)" is satisfied further, the above effect is achieved more successfully.

$$2.20 < D_1'/Iv \quad (5)'$$

$$D_1'/Iv < 2.50 \quad (5)''$$

When a zoom lens system, in order from the object side to the image side, comprising: a first lens unit having positive optical power; and a second lens unit having negative optical power, wherein the second lens unit is provided with a reflecting surface inside thereof, as the zoom lens system according to Embodiments 6 to 12, is applied to an imaging device in which in the accommodated state, part of the optical elements located on the object side relative to the reflective optical element is escaped from the position in the imaging state, as in Embodiments 1, 3 and 5, the zoom lens system is preferred to satisfy the following condition (6);

$$3.00 < D_2/Iv < 4.00 \quad (6)$$

where, $D_2$ is the optical axial distance from a surface on the most object side to a surface on the most image side among the optical elements escaped in accommodating, and Iv is the length of the image sensor in the short side direction.

The condition (6) relates to the thickness of the imaging device in the accommodated state. When the value exceeds the upper limit of the condition (6), the escaped optical elements become large, and so dose the space at the escape position. This causes an increase in the width or the height of the imaging device. In contrast, when the value goes below the lower limit of the condition (6), aberration fluctuation becomes large in the entire zoom lens system. This situation is undesirable.

When the range specified by at least one of the following conditions (6)' and (6)" is satisfied further, the above effect is achieved more successfully.

$$3.20 < D_2/Iv \quad (6)'$$

$$D_2/Iv < 3.50 \quad (6)''$$

When a zoom lens system, in order from the object side to the image side, comprises: a first lens unit having positive optical power and a second lens unit having negative optical power, wherein the second lens unit is provided with a reflecting surface inside thereof, as the zoom lens system according to Embodiments 6 to 12, is applied to an imaging device in which in the accommodated state, all the optical elements located on the object side relative to the reflective optical element are escaped from the position in the imaging state, as in Embodiments 2 and 4, the zoom lens system is preferred to satisfy the following condition (7);

$$3.80 < D_2'/Iv < 5.20 \quad (7)$$

where, $D_2'$ is the optical axial distance from a surface on the most object side to a surface on the most image side among the optical elements escaped in accommodating, and Iv is the length of the image sensor in the short side direction.

The condition (7) relates to the thickness of the imaging device in the accommodated state. When the value exceeds the upper limit of the condition (7), the escaped optical elements become large, and so dose the space at the escape position. This causes an increase in the width or the height of the imaging device. In contrast, when the value goes below the lower limit of the condition (7), aberration fluctuation becomes large in the entire zoom lens system. This situation is undesirable.

When the range specified by at least one of the following conditions (7)' and (7)" is satisfied further, the above effect is achieved more successfully.

$$4.00 < D_2'/Iv \quad (7)'$$

$$D_2'/Iv < 4.50 \quad (7)''$$

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (8) is satisfied;

$$-1.50 < f_2/f_W < -1.00 \quad (8)$$

(here, $Z = f_T/f_W > 5.0$)

where, $f_2$ is a composite focal length of the second lens unit, $f_W$ is a focal length of the entire zoom lens system at the wide-angle limit, and $f_T$ is a focal length of the entire zoom lens system at the telephoto limit.

The condition (8) relates to the error sensitivity of the second lens unit moved in the accommodated state of the imaging device. When the value exceeds the upper limit of the condition (8), aberration generated in the second lens unit becomes excessive, and hence causes difficulty in compensating coma aberration generated in the entire zoom lens system. In contrast, when the value goes below the lower limit of the condition (8), necessary effective diameter becomes large in the first lens unit. This causes a size increase in the entire zoom lens system.

When the range specified by at least one of the following conditions (8)' and (8)'' is satisfied further, the above effect is achieved more successfully.

$$-1.35 < f_2/f_W \qquad (8)'$$

$$f_2/f_W < -1.25 \qquad (8)''$$

(here, $Z = f_T/f_W > 5.0$)

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (9) is satisfied;

$$5.00 < f_T/f_W < 8.00 \qquad (9)$$

(here, $Z = f_T/f_W > 5.0$)

where, $f_1$ is a composite focal length of the first lens unit, $f_W$ is the focal length of the entire zoom lens system at the wide-angle limit, and $f_T$ is the focal length of the entire zoom lens system at the telephoto limit.

The condition (9) relates to the size of the reflecting surface moved in the accommodated state of the imaging device. When the value exceeds the upper limit of the condition (9), necessary reflecting surface becomes large. This causes a size increase in the entire second lens unit and hence in the entire zoom lens system. In contrast, when the value goes below the lower limit of the condition (9), the size of the reflecting surface can be reduced. Nevertheless, sufficient compensation of aberration becomes difficult.

When the range specified by at least one of the following conditions (9)' and (9)'' is satisfied further, the above effect is achieved more successfully.

$$6.00 < f_1/f_W \qquad (9)'$$

$$f_1/f_W < 7.50 \qquad (9)''$$

(here, $Z = f_T/f_W > 5.0$)

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (10) is satisfied;

$$0.80 < M_1/M_3 < 1.40 \qquad (10)$$

(here, $Z = f_T/f_W > 5.0$)

where, $M_1$ is an amount of movement of the first lens unit in zooming from the wide-angle limit to the telephoto limit, $M_3$ is an amount of movement of the third lens unit in zooming from the wide-angle limit to the telephoto limit, $f_W$ is the focal length of the entire zoom lens system at the wide-angle limit, and $f_T$ is the focal length of the entire zoom lens system at the telephoto limit.

The condition (10) sets forth the amount of movement of the first lens unit, and hence determines the thickness of the imaging device in the imaging state. When the value exceeds the upper limit of the condition (10), the amount of movement of the first lens unit increases, and so does the optical overall length at the telephoto limit. Thus, the drawn-out amount of the first lens unit becomes large, so that the mechanism of the lens barrel becomes complicated. In contrast, when the value goes below the lower limit of the condition (10), it becomes difficult to ensure a desired zoom ratio and excellent imaging characteristics.

When the range specified by at least one of the following conditions (10)' and (10)'' is satisfied further, the above effect is achieved more successfully.

$$0.90 < M_1/M_3 \qquad (10)'$$

$$M_1/M_3 < 1.20 \qquad (10)''$$

(here, $Z = f_T/f_W > 5.0$)

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (11) is satisfied;

$$3.00 < M_1/I_H < 5.00 \qquad (11)$$

(here, $Z = f_T/f_W > 5.0$)

where, $M_1$ is the amount of movement of the first lens unit in zooming from the wide-angle limit to the telephoto limit, $I_H$ is a length of the image sensor in the long side direction, $f_W$ is the focal length of the entire zoom lens system at the wide-angle limit, and $f_T$ is the focal length of the entire zoom lens system at the telephoto limit.

The condition (11) sets forth the amount of movement of the first lens unit, and hence determines the thickness of the imaging device. When the value exceeds the upper limit of the condition (11), the amount of movement of the first lens unit increases, and so does the optical overall length at the telephoto limit. This causes an increase in the thickness of the imaging device. In contrast, when the value goes below the lower limit of the condition (11), aberration fluctuation becomes large in the entire zoom lens system. This situation is undesirable.

When the range specified by at least one of the following conditions (11)' and (11)'' is satisfied further, the above effect is achieved more successfully.

$$3.50 < M_1/I_H \qquad (11)'$$

$$M_1/I_H < 4.50 \qquad (11)''$$

(here, $Z = f_T/f_W > 5.0$)

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (12) is satisfied;

$$0.45 < R_f/I_{mg} < 0.65 \qquad (12)$$

where, $R_i$ is an effective diameter of the light beam when the light beam reflected on the reflecting surface of the reflective optical element is projected on a surface perpendicular to the optical axis on the image sensor side, and $I_{mg}$ is an image circle diameter.

The condition (12) sets forth the size of the reflecting surface. When the value exceeds the upper limit of the condition (12), the entire zoom lens system becomes large. This situation is undesirable. In contrast, when the value goes below the lower limit of the condition (12), the size of the reflecting surface can be reduced. Nevertheless, sufficient compensation of aberration becomes difficult.

When the range specified by at least one of the following conditions (12)' and (12)" is satisfied further, the above effect is achieved more successfully.

$$0.50 < R_i/I_{mg} \quad (12)'$$

$$R_i/I_{mg} < 0.60 \quad (12)''$$

In a zoom lens system, in order from the object side to the image side, comprising: a first lens unit having positive optical power and a second lens unit having negative optical power, wherein the second lens unit is provided with a reflecting surface inside thereof, as in the zoom lens system according to Embodiments 6 to 12, it is preferable that the following condition (13) is satisfied;

$$-2.80 < f_{OJTW}/f_W < -1.80 \quad (13)$$

(here, $Z = f_T/f_W > 5.0$)

where, $f_{OJTW}$ is a composite focal length of the lens unit located on the object side relative to the reflecting surface at the wide-angle limit, $f_W$ is the focal length of the entire zoom lens system at the wide-angle limit, and $f_T$ is the focal length of the entire zoom lens system at the telephoto limit.

The condition (13) sets forth the focal length on the object side relative to the reflecting surface, and hence determines the size of the reflecting surface. When the value exceeds the upper limit of the condition (13), the entire zoom lens system becomes large. This situation is undesirable. In contrast, when the value goes below the lower limit of the condition (13), sufficient compensation of aberration becomes difficult.

When the range specified by at least one of the following conditions (13)' and (13)" is satisfied further, the above effect is achieved more successfully.

$$-2.50 < f_{OJTW}/f_W \quad (13)'$$

$$f_{OJTW}/f_W < -2.00 \quad (13)''$$

(here, $Z = f_T/f_W > 5.0$)

In a zoom lens system, in order from the object side to the image side, comprising: a first lens unit having positive optical power; a second lens unit having negative optical power; a third lens unit having positive optical power and a fourth lens unit having positive optical power, as in the zoom lens system according to Embodiments 6 to 12, it is preferable that the following condition (14) is satisfied;

$$4.00 < f_4/f_W < 7.0 \quad (14)$$

(here, $Z = f_T/f_W > 5.0$)

where, $f_4$ is a composite focal length of the fourth lens unit, $f_W$ is the focal length of the entire zoom lens system at the wide-angle limit, and $f_T$ is the focal length of the entire zoom lens system at the telephoto limit.

The condition (14) sets forth the focal length of the fourth lens unit. When the value exceeds the upper limit of the condition (14), it becomes difficult that spherical aberration and surface curvature are compensated with satisfactory balance in the entire zoom lens system. In contrast, when the value goes below the lower limit of the condition (14), the amount of movement in focusing becomes large. This situation is undesirable.

When the range specified by at least one of the following conditions (14)' and (14)" is satisfied further, the above effect is achieved more successfully.

$$4.50 < f_4/f_W \quad (14)'$$

$$f_4/f_W < 6.50 \quad (14)''$$

(here, $Z = f_T/f_W > 5.0$)

In a zoom lens system, in order from the object side to the image side, comprising: a first lens unit having positive optical power; a second lens unit having negative optical power; a third lens unit having positive optical power and a fourth lens unit having positive optical power, as in the zoom lens system according to Embodiments 6 to 12, it is preferable that the following condition (15) is satisfied;

$$-0.25 < \beta_{T4}/\beta_{W4} < 0.80 \quad (15)$$

(here, $Z = f_T/f_W > 5.0$, $\beta_{T4}/\beta_{W4} \neq 0$)

where, $\beta_{T4}$ is a magnification of the fourth lens unit at the telephoto limit in the infinity in-focus condition, $\beta_{W4}$ is a magnification of the fourth lens unit at the wide-angle limit in the infinity in-focus condition, $f_W$ is the focal length of the entire zoom lens system at the wide-angle limit, and $f_T$ is the focal length of the entire zoom lens system at the telephoto limit.

The condition (15) sets forth the magnification variation in the fourth lens unit, and hence sets forth zoom contribution of the fourth lens unit. When the value exceeds the upper limit of the condition (15), aberration becomes difficult to be compensated in the entire zoom lens system with satisfactory balance. In contrast, when the value goes below the lower limit of the condition (15), a desired zoom ratio becomes difficult to be obtained.

When the range specified by at least one of the following conditions (15)' and (15)" is satisfied further, the above effect is achieved more successfully.

$$0.00 < \beta_{T4}/\beta_{W4} \quad (15)'$$

$$\beta_{T4}/\beta_{W4} < 0.70 \quad (15)''$$

(here, $Z = f_T/f_W > 5.0$, $\beta_{T4}/\beta_{W4} \neq 0$)

In a zoom lens system, in order from the object side to the image side, comprising: a first lens unit having positive optical power; a second lens unit having negative optical power; a third lens unit having positive optical power and a fourth lens unit having positive optical power, as in the zoom lens system according to Embodiments 6 to 12, it is preferable that the following condition (16) is satisfied;

$$2.00 < f_3/f_4 < 5.00 \tag{16}$$

(here, $Z = f_T/f_W > 5.0$)

where, $f_3$ is a composite focal length of the third lens unit, $f_4$ is the composite focal length of the fourth lens unit, $f_W$ is the focal length of the entire zoom lens system at the wide-angle limit, and $f_T$ is the focal length of the entire zoom lens system at the telephoto limit.

The condition (16) sets forth the ratio of the focal lengths of the third lens unit and the fourth lens unit, and hence sets forth the function of each lens unit in zooming. When the value exceeds the upper limit of the condition (16), zooming effect decreases in the third lens unit. Thus, a desired zoom ratio becomes difficult to be obtained. In contrast, when the value goes below the lower limit of the condition (16), compensation of astigmatism becomes difficult in the entire zoom lens system.

When the range specified by at least one of the following conditions (16)' and (16)" is satisfied further, the above effect is achieved more successfully.

$$3.00 < f_3/f_4 \tag{16)'}$$

$$f_3/f_4 < 4.00 \tag{16)"}$$

(here, $Z = f_T/f_W > 5.0$)

The zoom lens system according to each of Embodiments 6 to 12 has been a zoom lens system of five units having a construction of positive, negative, positive, positive and positive, in order from the object side to the image side, comprising: a first lens unit having positive optical power; a second lens unit having negative optical power; a third lens unit having positive optical power; a fourth lens unit having positive optical power and a fifth lens unit having positive optical power. However, the present invention is not limited to this construction. The employed construction may be a four-unit construction of positive, negative, positive and positive; a three-unit construction of positive, negative and positive; or a five-unit construction of positive, negative, positive, negative and positive. That is, as long as comprising a first lens unit having positive optical power, a second lens unit having negative optical power and subsequent lens units, any zoom lens system may be applied to the lens barrel or the imaging device according to Embodiments 1 to 5.

Here, each lens unit in Embodiments 6 to 12 is composed exclusively of refractive type lens elements that deflect the incident light by refraction (that is, lens elements of a type in which deflection is achieved at the interface between media each having a distinct refractive index). However, the present invention is not limited thereto. For example, each lens unit may include: diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, Embodiments 6 to 12 has been described for the construction that a plate provided with an optical low-pass filter is arranged between the last surface of the zoom lens system and the image surface S. This low-pass filter may be a birefringent type low-pass filter made of, for example, a crystal whose predetermined crystal orientation is adjusted; or a phase type low-pass filter that achieves required characteristics of optical cut-off frequency by diffraction. Alternatively, in each embodiment, the low-pass filter may be omitted depending on the characteristics of the solid-state image sensor for receiving the optical image in the zoom lens system.

Further, an imaging device comprising a zoom lens system according to Embodiments 6 to 12 described above and an image sensor such as a CCD or a CMOS may be applied to a mobile telephone, a PDA (Personal Digital Assistance), a surveillance camera in a surveillance system, a Web camera, a vehicle-mounted camera or the like.

Further, the construction of the digital still camera and the zoom lens system according to Embodiments 6 to 12 described above is applicable also to a digital video camera for moving images. In this case, moving images with high resolution can be acquired in addition to still images.

EXAMPLES

Hereinafter, numerical examples which are concrete implementations of the zoom lens systems according to Embodiments 6 to 12 will be described. In the numerical examples, the units of the length in the tables are all mm. Moreover, in the numerical examples, r is the radius of curvature, d is the axial distance, nd is the refractive index to the d-line, and vd is the Abbe number. In the numerical examples, the surfaces marked with * are aspherical surfaces, and the aspherical surface configuration is defined by the following expression:

$$Z = \frac{h^2/r}{1+\sqrt{1-(1+\kappa)(h/r)^2}} + Dh^4 + Eh^6 + Fh^8 + Gh^{10} + Hh^{12} + Ih^{14} + Jh^{16}$$

Here, κ is the conic constant, D, E, F, G, H, I and J are a fourth-order, sixth-order, eighth-order, tenth-order, twelfth-order, fourteenth-order and sixteenth-order aspherical coefficients, respectively.

FIGS. 12A to 12I are longitudinal aberration diagrams of a zoom lens system according to Example 1. FIGS. 14A to 14I are longitudinal aberration diagrams of a zoom lens system according to Example 2. FIGS. 16A to 16I are longitudinal aberration diagrams of a zoom lens system according to Example 3. FIGS. 18A to 18I are longitudinal aberration diagrams of a zoom lens system according to Example 4. FIGS. 20A to 20I are longitudinal aberration diagrams of a zoom lens system according to Example 5. FIGS. 22A to 22I are longitudinal aberration diagrams of a zoom lens system according to Example 6. FIGS. 24A to 24I are longitudinal aberration diagrams of a zoom lens system according to Example 7.

FIGS. 12A to 12C, FIGS. 14A to 14C, FIGS. 16A to 16C, FIGS. 18A to 18C, FIGS. 20A to 20C, FIGS. 22A to 22C and FIGS. 24A to 24C show the aberration at the wide-angle limit. FIGS. 12D to 12F, FIGS. 14D to 14F, FIGS. 16D to 16F, FIGS. 18D to 18F, FIGS. 20D to 20F, FIGS. 22D to 22F and FIGS. 24D to 24F show the aberration at the middle position.

FIGS. 12G to 12I, FIGS. 14G to 14I, FIGS. 16G to 16I, FIGS. 18G to 18I, FIGS. 20G to 20I, FIGS. 22G to 22I and FIGS. 24G to 24I show the aberration at the telephoto limit. FIGS. 12A, 12D, 12G, 14A, 14D, 14G, 16A, 16D, 16G, 18A, 18D, 18G, 20A, 20D, 20G, 22A, 22D, 22G, 24A, 24D and 24G show the spherical aberration. FIGS. 12B, 12E, 12H, 14B, 14E, 14H, 16B, 16E, 16H, 18B, 18E, 18H, 20B, 20E, 20H, 22B, 22E, 22H, 24B, 24E and 24H show the astigmatism. FIGS. 12C, 12F, 12I, 14C, 14F, 14I, 16C, 16F, 16I, 18C, 18F, 18I, 20C, 20F, 20I, 22C, 22F, 22I, 24C, 24F and 24I show the distortion. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the half view angle, and the solid line and the dash line indicate the characteristics to the sagittal image plane (in each FIG., indicated as "s") and the meridional image plane (in each FIG., indicated as "m"), respectively. In each distortion diagram, the vertical axis indicates the half view angle.

Example 1

A zoom lens system of Example 1 corresponds to that of Embodiment 6 shown in FIGS. 11A to 11C. Table 1 shows the lens data of the zoom lens system of Example 1. Table 2 shows the focal length, the F-number, the angle of view, the optical overall length and the variable axial distance data, when the shooting distance is ∞. Table 3 shows the aspherical data.

TABLE 1

| Lens unit | Lens element | Surface | r | d | nd | vd |
|---|---|---|---|---|---|---|
| G1 | L1 | 1 | 37.063 | 1.000 | 1.84666 | 23.78 |
| | L2 | 2 | 24.652 | 4.600 | 1.49700 | 81.61 |
| | | 3 | ∞ | 0.150 | | |
| | L3 | 4 | 26.244 | 2.900 | 1.77250 | 49.65 |
| | | 5 | 77.733 | Variable | | |
| G2 | L4 | 6 | 77.733 | 0.650 | 1.83400 | 37.35 |
| | | 7 | 6.477 | 2.861 | | |
| | L5 | 8 | ∞ | 9.000 | 1.62299 | 58.11 |
| | | 9 | ∞ | 0.650 | | |
| | L6 | 10 | −25.209* | 1.100 | 1.60602 | 57.44 |
| | | 11 | 25.410 | 0.600 | | |
| | L7 | 12 | 65.498 | 2.000 | 1.84666 | 23.78 |
| | L8 | 13 | −15.314 | 0.600 | 1.72916 | 54.66 |
| | | 14 | −117.149 | Variable | | |
| | Diaphragm | 15 | ∞ | 1.800 | | |
| G3 | L9 | 16 | 11.411* | 2.000 | 1.74993 | 45.37 |
| | | 17 | 5567.666 | 3.170 | | |
| | L10 | 18 | 8.561 | 1.800 | 1.65160 | 58.44 |
| | L11 | 19 | 51.156 | 0.600 | 1.84666 | 23.78 |
| | | 20 | 6.246 | Variable | | |
| G4 | L12 | 21 | 9.563* | 2.000 | 1.51450 | 63.05 |
| | | 22 | 20.711 | Variable | | |
| G5 | L13 | 23 | 13.588 | 2.150 | 1.69680 | 55.48 |
| | L14 | 24 | −13.588 | 0.600 | 1.84666 | 23.78 |
| | | 25 | −40.372 | 0.500 | | |

TABLE 1-continued

| Lens unit | Lens element | Surface | r | d | nd | vd |
|---|---|---|---|---|---|---|
| | P | 26 | ∞ | 0.900 | 1.51680 | 64.20 |
| | | 27 | ∞ | | | |

TABLE 2

| Axial distance | Wide-angle limit | Middle position | Telephoto limit |
|---|---|---|---|
| f | 5.60 | 17.78 | 55.94 |
| F | 2.90 | 3.84 | 4.04 |
| ω | 29.74 | 10.20 | 3.27 |
| L | 81.416 | 91.500 | 100.330 |
| d5 | 0.600 | 10.692 | 19.499 |
| d14 | 21.053 | 8.984 | 2.100 |
| d20 | 6.441 | 8.524 | 13.872 |
| d22 | 10.605 | 20.591 | 22.126 |

TABLE 3

| Surface | κ | D | E | F | G |
|---|---|---|---|---|---|
| 10 | 0.00000E+00 | 2.05463E−04 | 1.42715E−06 | −7.30631E−08 | 5.54472E−09 |
| 16 | 0.00000E+00 | −6.02689E−05 | 2.80713E−08 | −9.04056E−09 | 0.00000E+00 |
| 21 | 0.00000E+00 | −1.13310E−04 | −4.35396E−07 | 3.74061E−08 | −1.32270E−09 |

Example 2

A zoom lens system of Example 2 corresponds to that of Embodiment 7 shown in FIGS. 13A to 13C. Table 4 shows the lens data of the zoom lens system of Example 2. Table 5 shows the focal length, the F-number, the angle of view, the optical overall length and the variable axial distance data, when the shooting distance is ∞. Table 6 shows the aspherical data.

TABLE 4

| Lens unit | Lens element | Surface | r | d | nd | vd |
|---|---|---|---|---|---|---|
| G1 | L1 | 1 | 36.244 | 1.000 | 1.84666 | 23.78 |
| | L2 | 2 | 25.600 | 4.600 | 1.49700 | 81.61 |
| | | 3 | ∞ | 0.150 | | |
| | L3 | 4 | 33.555 | 3.466 | 1.77250 | 49.65 |
| | | 5 | 88.232 | Variable | | |
| G2 | L4 | 6 | 88.232 | 0.650 | 1.83400 | 37.35 |
| | | 7 | 7.251 | 2.602 | | |
| | L5 | 8 | ∞ | 9.000 | 1.62299 | 58.11 |
| | | 9 | ∞ | 0.756 | | |
| | L6 | 10 | −17.065 | 0.800 | 1.65160 | 58.44 |
| | | 11 | 21.795 | 0.650 | | |
| | L7 | 12 | 202.579 | 1.900 | 2.00170 | 20.65 |
| | | 13 | −27.925* | Variable | | |
| | Diaphragm | 14 | ∞ | 1.800 | | |
| G3 | L8 | 15 | 11.307* | 2.044 | 1.74993 | 45.37 |
| | | 16 | −208.237 | 2.797 | | |
| | L9 | 17 | 10.178 | 1.778 | 1.65160 | 58.44 |
| | L10 | 18 | −111.193 | 0.622 | 1.80518 | 25.46 |
| | | 19 | 6.726 | Variable | | |

TABLE 4-continued

| Lens unit | Lens element | Surface | r | d | nd | vd |
|---|---|---|---|---|---|---|
| G4 | L11 | 20 | 11.582* | 1.800 | 1.51450 | 63.05 |
|  |  | 21 | 53.706 | Variable |  |  |
| G5 | L12 | 22 | 13.644 | 2.150 | 1.69680 | 55.48 |
|  | L13 | 23 | −13.644 | 0.600 | 1.80518 | 25.46 |
|  |  | 24 | −59.885 | 0.500 |  |  |
|  | P | 25 | ∞ | 0.900 | 1.51680 | 64.20 |
|  |  | 26 | ∞ |  |  |  |

TABLE 5

| Axial distance | Wide-angle limit | Middle position | Telephoto limit |
|---|---|---|---|
| f | 5.60 | 17.78 | 55.93 |
| F | 2.89 | 3.78 | 3.79 |
| ω | 29.75 | 10.20 | 3.27 |
| L | 78.639 | 90.603 | 101.859 |
| d5 | 0.600 | 12.574 | 23.811 |
| d13 | 20.267 | 7.840 | 2.100 |
| d19 | 5.526 | 8.652 | 16.101 |
| d21 | 10.599 | 19.899 | 18.190 |

TABLE 6

| Surface | κ | D | E | F | G |
|---|---|---|---|---|---|
| 13 | 2.22313E+00 | −7.05665E−05 | −1.97008E−07 | 1.70601E−09 | −1.10470E−09 |
| 15 | 3.37210E−01 | −1.01046E−04 | 2.14240E−07 | −4.25979E−08 | 6.80283E−10 |
| 20 | 1.63894E−01 | −8.99328E−05 | 4.44281E−07 | −1.57646E−08 | −7.63510E−11 |

Example 3

A zoom lens system of Example 3 corresponds to that of Embodiment 8 shown in FIGS. 15A to 15C. Table 7 shows the lens data of the zoom lens system of Example 3. Table 8 shows the focal length, the F-number, the angle of view, the optical overall length and the variable axial distance data, when the shooting distance is ∞. Table 9 shows the aspherical data.

TABLE 7

| Lens unit | Lens element | Surface | r | d | nd | vd |
|---|---|---|---|---|---|---|
| G1 | L1 | 1 | 35.649 | 1.000 | 1.84666 | 23.78 |
|  | L2 | 2 | 24.155 | 4.600 | 1.49700 | 81.61 |
|  |  | 3 | ∞ | 0.150 |  |  |
|  | L3 | 4 | 27.312 | 2.900 | 1.77250 | 49.65 |
|  |  | 5 | 84.456 | Variable |  |  |
| G2 | L4 | 6 | 84.456 | 0.650 | 1.83400 | 37.35 |
|  |  | 7 | 5.848 | 2.608 |  |  |
|  | L5 | 8 | ∞ | 9.000 | 1.62299 | 58.11 |
|  |  | 9 | ∞ | 0.324 |  |  |
|  | L6 | 10 | −21.301* | 0.720 | 1.66547 | 55.18 |
|  |  | 11 | 17.419 | 0.485 |  |  |
|  | L7 | 12 | 36.744 | 2.000 | 1.84666 | 23.78 |
|  |  | 13 | −23.72 | Variable |  |  |
| Diaphragm |  | 14 | ∞ | 1.800 |  |  |
| G3 | L8 | 15 | 11.496* | 2.000 | 1.74993 | 45.37 |
|  |  | 16 | −73.174 | 3.262 |  |  |
|  | L9 | 17 | 11.831 | 1.800 | 1.65160 | 58.44 |
|  | L10 | 18 | −26.925 | 0.600 | 1.80518 | 25.46 |
|  |  | 19 | 7.009 | Variable |  |  |
| G4 | L11 | 20 | 11.933* | 1.800 | 1.51450 | 63.05 |
|  |  | 21 | 31.454 | Variable |  |  |
| G5 | L12 | 22 | 13.241 | 2.150 | 1.69680 | 55.48 |
|  | L13 | 23 | −13.241 | 0.600 | 1.75520 | 27.52 |
|  |  | 24 | −40.391 | 0.500 |  |  |
|  | P | 25 | ∞ | 0.900 | 1.51680 | 64.20 |
|  |  | 26 | ∞ |  |  |  |

TABLE 8

| Axial distance | Wide-angle limit | Middle position | Telephoto limit |
|---|---|---|---|
| f | 5.60 | 17.78 | 55.87 |
| F | 2.89 | 3.94 | 4.20 |
| ω | 29.74 | 10.20 | 3.28 |
| L | 80.612 | 90.175 | 99.530 |
| d5 | 0.600 | 10.177 | 19.495 |

TABLE 8-continued

| Axial distance | Wide-angle limit | Middle position | Telephoto limit |
|---|---|---|---|
| d13 | 22.958 | 9.039 | 2.100 |
| d19 | 6.870 | 11.570 | 21.064 |
| d21 | 9.243 | 18.463 | 15.907 |

TABLE 9

| Surface | κ | D | E | F | G |
|---|---|---|---|---|---|
| 10 | 0.00000E+00 | 2.94613E−04 | 3.42754E−06 | −1.36154E−07 | 7.20999E−09 |
| 15 | 0.00000E+00 | −7.97329E−05 | 6.33797E−08 | −1.42916E−08 | 1.27635E−10 |
| 20 | 0.00000E+00 | −5.27869E−05 | 8.63176E−08 | 1.15686E−09 | −2.44882E−10 |

Example 4

A zoom lens system of Example 4 corresponds to that of Embodiment 9 shown in FIGS. 17A to 17C. Table 10 shows the lens data of the zoom lens system of Example 4. Table 11 shows the focal length, the F-number, the angle of view, the optical overall length and the variable axial distance data, when the shooting distance is ∞. Table 12 shows the aspherical data.

TABLE 10

| Lens unit | Lens element | Surface | r | d | nd | vd |
|---|---|---|---|---|---|---|
| G1 | L1 | 1 | 34.306 | 1.000 | 1.84666 | 23.78 |
|  | L2 | 2 | 23.123 | 4.600 | 1.49700 | 81.61 |
|  |  | 3 | ∞ | 0.150 |  |  |
|  | L3 | 4 | 29.072 | 2.900 | 1.77250 | 49.65 |
|  |  | 5 | 100.377 | Variable |  |  |
| G2 | L4 | 6 | 100.377 | 0.650 | 1.83500 | 42.97 |
|  |  | 7 | 6.648 | 2.494 |  |  |
|  | L5 | 8 | ∞ | 9.000 | 1.62299 | 58.11 |
|  |  | 9 | ∞ | 0.508 |  |  |
|  | L6 | 10 | −20.073 | 0.720 | 1.58913 | 61.24 |
|  |  | 11 | 16.959 | 0.485 |  |  |
|  | L7 | 12 | 86.423 | 2.000 | 2.00170 | 20.65 |
|  |  | 13 | −32.952* | Variable |  |  |
| Diaphragm |  | 14 | ∞ | 1.800 |  |  |
| G3 | L8 | 15 | 11.148* | 2.000 | 1.74993 | 45.37 |
|  |  | 16 | −74.815 | 2.971 |  |  |
|  | L9 | 17 | 11.301 | 1.800 | 1.65160 | 58.44 |
|  | L10 | 18 | −29.458 | 0.600 | 1.78472 | 25.72 |
|  |  | 19 | 6.79 | Variable |  |  |
| G4 | L11 | 20 | 10.397* | 1.800 | 1.51450 | 63.05 |
|  |  | 21 | 23.685 | Variable |  |  |
| G5 | L12 | 22 | 13.408 | 2.150 | 1.69680 | 55.48 |
|  | L13 | 23 | −13.408 | 0.600 | 1.75520 | 27.52 |
|  |  | 24 | −42.027 | 0.500 |  |  |
| P |  | 25 | ∞ | 0.900 | 1.51680 | 64.20 |
|  |  | 26 | ∞ |  |  |  |

TABLE 11

| Axial distance | Wide-angle limit | Middle position | Telephoto limit |
|---|---|---|---|
| f | 5.60 | 17.79 | 55.95 |
| F | 2.89 | 3.90 | 4.09 |
| ω | 29.74 | 10.20 | 3.27 |
| L | 77.428 | 87.072 | 96.299 |
| d5 | 0.600 | 10.260 | 19.460 |
| d13 | 20.574 | 8.417 | 2.100 |
| d19 | 6.680 | 9.145 | 16.903 |
| d21 | 8.857 | 18.550 | 17.109 |

TABLE 12

| Surface | κ | D | E | F | G |
|---|---|---|---|---|---|
| 13 | 0.00000E+00 | −1.06522E−04 | −1.91684E−06 | 1.28833E−07 | −5.44280E−09 |
| 15 | 0.00000E+00 | −8.60597E−05 | −4.99882E−07 | 2.58698E−08 | −8.97107E−10 |
| 20 | 0.00000E+00 | −9.69197E−05 | 1.54946E−08 | −1.34116E−08 | 2.86781E−10 |

Example 5

A zoom lens system of Example 5 corresponds to that of Embodiment 10 shown in FIGS. 19A to 19C. Table 13 shows the lens data of the zoom lens system of Example 5. Table 14 shows the focal length, the F-number, the angle of view, the optical overall length and the variable axial distance data, when the shooting distance is ∞. Table 15 shows the aspherical data.

TABLE 13

| Lens unit | Lens element | Surface | r | d | nd | vd |
|---|---|---|---|---|---|---|
| G1 | L1 | 1 | 46.985 | 1.000 | 1.84666 | 23.78 |
|  | L2 | 2 | 28.672 | 4.500 | 1.48749 | 70.45 |
|  |  | 3 | ∞ | 0.150 |  |  |
|  | L3 | 4 | 29.163 | 2.761 | 1.77250 | 49.65 |
|  |  | 5 | 93.246 | Variable |  |  |
| G2 | L4 | 6 | 127.033 | 0.622 | 1.83400 | 37.35 |
|  |  | 7 | 7.551 | 2.646 |  |  |
|  | L5 | 8 | ∞ | 9.955 | 1.60602 | 57.44 |
|  |  | 9 | 31.836* | 0.578 |  |  |
|  | L6 | 10 | 94.09 | 1.956 | 1.84666 | 23.78 |
|  | L7 | 11 | −14.591 | 0.622 | 1.72916 | 54.65967 |
|  |  | 12 | 48.529 | Variable |  |  |
| Diaphragm |  | 13 | ∞ | 1.800 |  |  |
| G3 | L8 | 14 | 10.916* | 1.956 | 1.74993 | 45.37 |
|  |  | 15 | 5567.666 | 2.004 |  |  |
|  | L9 | 16 | 9.761 | 1.778 | 1.65160 | 58.44 |
|  | L10 | 17 | 32.297 | 0.622 | 1.84666 | 23.78 |
|  |  | 18 | 6.604 | Variable |  |  |
| G4 | L11 | 19 | 11.976* | 2.000 | 1.48749 | 70.45 |
|  |  | 20 | 63.194 | Variable |  |  |
| G5 | L12 | 21 | 11.436 | 2.178 | 1.69680 | 55.48 |
|  | L13 | 22 | −11.436 | 0.622 | 1.80518 | 25.46 |
|  |  | 23 | 41.000 | 0.500 |  |  |
| P |  | 24 | ∞ | 0.900 | 1.51680 | 64.20 |
|  |  | 25 | ∞ |  |  |  |

TABLE 14

| Axial distance | Wide-angle limit | Middle position | Telephoto limit |
|---|---|---|---|
| f | 5.60 | 17.78 | 55.93 |
| F | 2.89 | 3.75 | 4.13 |
| ω | 29.75 | 10.21 | 3.28 |
| L | 81.703 | 94.023 | 104.467 |
| d5 | 0.600 | 12.920 | 23.353 |
| d12 | 23.380 | 9.868 | 1.867 |
| d18 | 6.930 | 11.092 | 13.247 |
| d20 | 10.558 | 19.908 | 25.755 |

TABLE 15

| Surface | κ | D | E | F | G |
|---|---|---|---|---|---|
| 9 | 0.00000E+00 | −1.60705E−04 | 1.64721E−06 | −7.71965E−08 | −4.99959E−10 |
| 14 | 0.00000E+00 | −7.19236E−05 | −5.84526E−08 | −1.00972E−08 | 0.00000E+00 |
| 19 | 0.00000E+00 | −6.06010E−05 | 5.45162E−07 | 9.15106E−10 | −4.43653E−10 |

Example 6

A zoom lens system of Example 6 corresponds to that of Embodiment 11 shown in FIGS. 21A to 21C. Table 16 shows the lens data of the zoom lens system of Example 6. Table 17 shows the focal length, the F-number, the angle of view, the optical overall length and the variable axial distance data, when the shooting distance is ∞. Table 18 shows the aspherical data.

Example 7

A zoom lens system of Example 7 corresponds to that of Embodiment 12 shown in FIGS. 23A to 23C. Table 19 shows the lens data of the zoom lens system of Example 7. Table 20 shows the focal length, the F-number, the angle of view, the optical overall length and the variable axial distance data, when the shooting distance is ∞. Table 21 shows the aspherical data.

TABLE 16

| Lens unit | Lens element | Surface | r | d | nd | vd |
|---|---|---|---|---|---|---|
| G1 | L1 | 1 | 46.585 | 1.000 | 1.84666 | 23.78 |
|  | L2 | 2 | 28.527 | 4.273 | 1.48749 | 70.45 |
|  |  | 3 | ∞ | 0.150 |  |  |
|  | L3 | 4 | 30.408 | 3.471 | 1.77250 | 49.65 |
|  |  | 5 | 106.799 | Variable |  |  |
| G2 | L4 | 6 | 131.939 | 0.650 | 1.83400 | 37.35 |
|  |  | 7 | 7.696 | 2.587 |  |  |
|  | L5 | 8 | ∞ | 10.100 | 1.60602 | 57.44 |
|  |  | 9 | 25.174* | 0.711 |  |  |
|  | L6 | 10 | −35.648 | 0.650 | 1.77250 | 49.65 |
|  | L7 | 11 | 14.715 | 2.000 | 1.84666 | 23.78258 |
|  |  | 12 | −48.522 | Variable |  |  |
| Diaphragm |  | 13 | ∞ | 1.600 |  |  |
| G3 | L8 | 14 | 11.653* | 2.000 | 1.74993 | 45.37 |
|  |  | 15 | 4504.53 | 2.460 |  |  |
|  | L9 | 16 | 9.179 | 1.800 | 1.65160 | 58.44 |
|  | L10 | 17 | 33.066 | 0.600 | 1.84666 | 23.78 |
|  |  | 18 | 6.653 | Variable |  |  |
| G4 | L11 | 19 | 12.293* | 2.000 | 1.48749 | 70.45 |
|  |  | 20 | 82.68 | Variable |  |  |
| G5 | L12 | 21 | 12.182 | 2.200 | 1.69680 | 55.48 |
|  | L13 | 22 | −12.182 | 0.600 | 1.78472 | 25.72 |
|  |  | 23 | 54.321 | 0.500 |  |  |
|  | P | 24 | ∞ | 0.900 | 1.51680 | 64.20 |
|  |  | 25 | ∞ |  |  |  |

TABLE 17

| Axial distance | Wide-angle limit | Middle position | Telephoto limit |
|---|---|---|---|
| f | 5.60 | 17.78 | 55.94 |
| F | 2.87 | 3.75 | 3.97 |
| ω | 29.75 | 10.21 | 3.27 |
| L | 81.578 | 93.609 | 104.482 |
| d5 | 0.600 | 12.631 | 23.490 |
| d12 | 22.459 | 9.128 | 1.900 |
| d18 | 6.295 | 9.908 | 13.587 |
| d20 | 10.884 | 20.602 | 24.151 |

TABLE 18

| Surface | κ | D | E | F | G |
|---|---|---|---|---|---|
| 9 | 0.00000E+00 | −1.41372E−04 | 1.78010E−06 | −9.48659E−08 | −1.63084E−10 |
| 14 | 0.00000E+00 | −6.03592E−05 | 8.76463E−08 | −1.11835E−08 | 5.17256E−11 |
| 19 | 0.00000E+00 | −6.10466E−05 | 4.15704E−07 | 8.08493E−09 | −5.08154E−10 |

TABLE 19

| Lens unit | Lens element | Surface | r | d | nd | vd |
|---|---|---|---|---|---|---|
| G1 | L1 | 1 | 46.262 | 1.000 | 1.84666 | 23.78 |
|  | L2 | 2 | 29.073 | 5.000 | 1.48749 | 70.45 |
|  |  | 3 | ∞ | 0.150 |  |  |
|  | L3 | 4 | 34.129 | 3.450 | 1.77250 | 49.65 |
|  |  | 5 | 131.374 | Variable |  |  |
| G2 | L4 | 6 | 131.374 | 0.622 | 1.83500 | 42.97 |
|  |  | 7 | 7.415 | 3.107 |  |  |
|  | L5 | 8 | ∞ | 9.955 | 1.60602 | 57.44 |
|  |  | 9 | 8.982* | 0.889 |  |  |
|  | L6 | 10 | 14.445 | 1.956 | 1.84666 | 23.78 |
|  |  | 11 | 124.554 | Variable |  |  |
| Diaphragm |  | 12 | ∞ | 1.600 |  |  |
| G3 | L7 | 13 | 11.406* | 2.222 | 1.74993 | 45.37 |
|  |  | 14 | −179.729 | 2.364 |  |  |
|  | L8 | 15 | 9.109 | 1.778 | 1.65160 | 58.44 |
|  | L9 | 16 | 51.305 | 0.622 | 1.84666 | 23.78 |
|  |  | 17 | 6.386 | Variable |  |  |
| G4 | L10 | 18 | 12.858* | 2.000 | 1.48749 | 70.45 |
|  |  | 19 | 50.758 | Variable |  |  |
| G5 | L11 | 20 | 18.068 | 2.178 | 1.69680 | 55.48 |
|  | L12 | 21 | −18.068 | 0.622 | 1.80610 | 40.73 |
|  |  | 22 | −86.793 | 0.500 |  |  |
|  | P | 23 | ∞ | 0.900 | 1.51680 | 64.20 |
|  |  | 24 | ∞ |  |  |  |

TABLE 20

| Axial distance | Wide-angle limit | Middle position | Telephoto limit |
|---|---|---|---|
| f | 5.60 | 17.77 | 55.92 |
| F | 3.02 | 4.27 | 4.63 |
| ω | 29.76 | 10.21 | 3.28 |
| L | 80.802 | 91.712 | 104.466 |
| d5 | 0.600 | 11.503 | 24.260 |
| d11 | 23.928 | 8.932 | 1.867 |
| d17 | 4.482 | 10.595 | 15.187 |
| d19 | 9.787 | 18.670 | 21.143 |

TABLE 21

| Surface | κ | D | E | F | G |
| --- | --- | --- | --- | --- | --- |
| 9 | 0.00000E+00 | −3.17619E−04 | 4.00225E−06 | −3.61249E−07 | 6.75321E−09 |
| 13 | 0.00000E+00 | −6.93182E−05 | 3.50240E−07 | −3.73254E−08 | 5.84032E−10 |
| 18 | 0.00000E+00 | −6.18889E−05 | 3.97368E−07 | 3.14618E−08 | −1.22505E−09 |

The corresponding values to the above conditions are listed in the following Table 22.

TABLE 22

| | Example | | | | | | |
| --- | --- | --- | --- | --- | --- | --- | --- |
| Condition | 1 | 2 | 3 | 4 | 5 | 6 | 7 |
| ΣD/ΣdAIR | 0.709 | 0.698 | 0.646 | 0.693 | 0.605 | 0.645 | 0.668 |
| D1/D2 | 0.667 | 0.753 | 0.742 | 0.732 | 0.689 | 0.709 | 0.799 |
| D1'/D2' | 0.495 | 0.563 | 0.548 | 0.546 | 0.514 | 0.533 | 0.581 |
| D1/IV | 2.422 | 2.569 | 2.422 | 2.422 | 2.352 | 2.485 | 2.662 |
| D1'/IV | 2.253 | 2.400 | 2.253 | 2.253 | 2.190 | 2.316 | 2.500 |
| D2/IV | 3.633 | 3.413 | 3.263 | 3.311 | 3.414 | 3.505 | 3.333 |
| D2'/IV | 4.547 | 4.260 | 4.111 | 4.129 | 4.265 | 4.348 | 4.304 |
| f2/fW | −1.160 | −1.249 | −1.310 | −1.201 | −1.299 | −1.267 | −1.409 |
| f1/fW | 6.344 | 7.425 | 6.305 | 6.324 | 7.529 | 7.498 | 7.898 |
| M1/M3 | 0.998 | 1.278 | 0.907 | 1.021 | 1.058 | 1.114 | 1.073 |
| M1/IH | 3.694 | 4.535 | 3.695 | 3.686 | 4.446 | 4.473 | 4.622 |
| Ri/Img | 0.528 | 0.528 | 0.574 | 0.540 | 0.550 | 0.539 | 0.541 |
| fOJTW/fW | −2.406 | −2.645 | −2.061 | −2.430 | −2.565 | −2.674 | −2.482 |
| f4/fW | 5.810 | 5.052 | 6.469 | 6.149 | 5.345 | 5.241 | 6.204 |
| βT4/βW4 | 0.225 | 0.338 | 0.670 | 0.559 | −0.170 | −0.089 | 0.392 |
| f3/f4 | 3.692 | 3.719 | 3.645 | 3.382 | 3.854 | 3.861 | 3.629 |

The lens barrel and the imaging device according to the present invention are applicable to a camera such as a digital still camera, a digital video camera, a mobile telephone, a PDA (Personal Digital Assistance), a surveillance camera in a surveillance system, a Web camera or a vehicle-mounted camera. In particular, the present lens barrel and the present imaging device are suitable for a camera such as a digital still camera or a digital video camera, requiring high image quality.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A lens barrel for holding an imaging optical system that forms an optical image of an object, wherein
the imaging optical system is a zoom lens system and comprises: an object side lens unit onto which light ray from the object is incident; and a reflective optical element having a reflecting surface for bending the light ray exiting from the object side lens unit, and wherein
in an imaging state, the object side lens unit is held in a manner movable in a direction of the light ray from the object,
while in an accommodated state, the reflective optical element is escaped to an escape position different from a position located in the imaging state, and wherein
the object side lens unit moves in an optical axis direction during zooming.

2. The lens barrel as claimed in claim 1, wherein the reflective optical element is provided with a reflecting surface for bending by approximately 90° an axial principal ray from the object.

3. The lens barrel as claimed in claim 1, wherein the imaging optical system comprises:
an object side lens unit located on the object side relative to the reflective optical element; and
an image side lens unit located on the image side relative to the reflective optical element, and wherein
in the accommodated state, at least part of the object side lens unit is moved into a space based on a place where the reflective optical element is located in the imaging state.

4. The lens barrel as claimed in claim 1, wherein the reflective optical element is escaped in a direction perpendicular to a not-reflected axial principal ray from the object.

5. The lens barrel as claimed in claim 4, wherein the reflective optical element is escaped to an image side of the imaging optical system in a direction perpendicular to the not-reflected axial principal ray from the object.

6. A lens barrel for holding an imaging optical system that forms an optical image of an object, wherein the imaging optical system comprises: an object side lens unit onto which light ray from the object is incident; and a reflective optical element having a reflecting surface for bending the light ray exiting from the object side lens unit, and wherein
in an imaging state, the object side lens unit is held in a manner movable in a direction of the light ray from the object, while in an accommodated state, the reflective optical element is escaped to an escape position different from a position located in the imaging state, and
wherein the imaging optical system is a zoom lens system, in order from the object side to the image side, comprising:
a first lens unit having positive optical power;
a second lens unit having negative optical power and, in order from the object side to the image side, including a negative meniscus lens element whose image side surface has the more intense optical power, a reflective optical element and at least one subsequent lens element; and
at least one subsequent lens unit.

7. The lens barrel as claimed in claim 6, wherein the imaging optical system satisfies the following condition (1):

$$0.50 < \Sigma D / \Sigma d_{AIR} < 1.00 \quad (1)$$

where,
$\Sigma D$ is the optical axial total thickness of each lens unit located between the second lens unit and a lens unit that is located on the image side relative to the second lens unit and that does not move in an optical axis direction in zooming, and
$\Sigma d_{AIR}$ is the optical axial total air space of the each lens unit located between the second lens unit and a lens unit that is located on the image side relative to the second lens unit and that does not move in the optical axis direction in zooming.

8. The lens barrel as claimed in claim 6, wherein in the accommodated state, an optical element except for the negative meniscus lens element among the second lens unit components is escaped to an escape position different from a position located in the imaging state.

9. The lens barrel as claimed in claim 8, wherein the imaging optical system satisfies the following condition (2):

$$0.60 < D_1/D_2 < 0.85 \quad (2)$$

where;
$D_1$ is the optical axial distance from a surface on the most object side to a surface on the most image side among all the optical elements located on the object side relative to the optical elements escaped in accommodating, and
$D_2$ is the optical axial distance from a surface on the most object side to a surface on the most image side among the optical elements escaped in accommodating.

10. The lens barrel as claimed in claim 8, wherein the imaging optical system satisfies the following condition (4):

$$2.00 < D_1/I_V < 2.80 \quad (4)$$

where,
$D_1$ is the optical axial distance from a surface on the most object side to a surface on the most image side among all the optical elements located on the object side relative to the optical elements escaped in accommodating, and
$I_V$ is a length of the image sensor in the short side direction.

11. The lens barrel as claimed in claim 8, wherein the imaging optical system satisfies the following condition (6):

$$3.00 < D_2/I_V < 4.00 \quad (6)$$

where,
$D_2$ is the optical axial distance from a surface on the most object side to a surface on the most image side among the optical elements escaped in accommodating, and
$I_v$ is the length of the image sensor in the short side direction.

12. The lens barrel as claimed in claim 6, wherein in the accommodated state, the entire second lens unit is escaped to an escape position different from a position located in the imaging state.

13. The lens barrel as claimed in claim 12, wherein the imaging optical system satisfies the following condition (3):

$$0.45 < D_1'/D_2' < 0.65 \quad (3)$$

where,
$D_1'$ is the optical axial distance from a surface on the most object side to a surface on the most image side among all the optical elements located on the object side relative to the optical elements escaped in accommodating, and
$D_2'$ is the optical axial distance from a surface on the most object side to a surface on the most image side among the optical elements escaped in accommodating.

14. The lens barrel as claimed in claim 12, wherein the imaging optical system satisfies the following condition (5):

$$2.00 < D_1'/I_V < 2.80 \quad (5)$$

where,
$D_1'$ is the optical axial distance from a surface on the most object side to a surface on the most image side among all the optical elements located on the object side relative to the optical elements escaped in accommodating, and
$I_V$ is the length of the image sensor in the short side direction.

15. The lens barrel as claimed in claim 12, wherein the imaging optical system satisfies the following condition (7):

$$3.80 < D_2'/I_V < 5.20 \quad (7)$$

where,
$D_2'$ is the optical axial distance from a surface on the most object side to a surface on the most image side among the optical elements escaped in accommodating, and
$I_v$ is the length of the image sensor in the short side direction.

16. The lens barrel as claimed in claim 6, wherein the imaging optical system satisfies the following condition (8):

$$-1.50 < f_2/f_W < -1.00 \quad (8)$$

(here, $Z = f_T/f_W > 5.0$)

where,
$f_2$ is a composite focal length of the second lens unit,
$f_W$ is a focal length of the entire zoom lens system at the wide-angle limit, and
$f_T$ is a focal length of the entire zoom lens system at the telephoto limit.

17. The lens barrel as claimed in claim 6, wherein the imaging optical system satisfies the following condition (9):

$$5.00 < f_1/f_W < 8.00 \quad (9)$$

(here, $Z = f_T/f_W > 5.0$)

where,
$f_1$ is a composite focal length of the first lens unit,
$f_W$ is the focal length of the entire zoom lens system at the wide-angle limit, and
$f_T$ is the focal length of the entire zoom lens system at the telephoto limit.

18. The lens barrel as claimed in claim 6, wherein the imaging optical system satisfies the following condition (10):

$$0.80 < M_1/M_3 < 1.40 \quad (10)$$

(here, $Z = f_T/f_W > 5.0$)

where,
- $M_1$ is an amount of movement of the first lens unit in zooming from the wide-angle limit to the telephoto limit,
- $M_3$ is an amount of movement of the third lens unit in zooming from the wide-angle limit to the telephoto limit,
- $f_W$ is the focal length of the entire zoom lens system at the wide-angle limit, and
- $f_T$ is the focal length of the entire zoom lens system at the telephoto limit.

19. The lens barrel as claimed in claim 6, wherein the imaging optical system satisfies the following condition (11):

$$3.00 < M_1/I_H < 5.00 \qquad (11)$$

(here, $Z=f_T/f_W>5.0$)

where,
- $M_1$ is the amount of movement of the first lens unit in zooming from the wide-angle limit to the telephoto limit,
- $I_H$ is a length of the image sensor in the long side direction,
- $f_W$ is the focal length of the entire zoom lens system at the wide-angle limit, and
- $f_T$ is the focal length of the entire zoom lens system at the telephoto limit.

20. The lens barrel as claimed in claim 6, wherein the imaging optical system satisfies the following condition (12):

$$0.45 < R_i/I_{mg} < 0.65 \qquad (12)$$

where,
- $R_i$ is an effective diameter of the light beam when the light beam reflected on the reflecting surface of the reflective optical element is projected on a surface perpendicular to the optical axis on the image sensor side, and
- $I_{mg}$ is an image circle diameter.

21. The lens barrel as claimed in claim 6, wherein the imaging optical system satisfies the following condition (13):

$$-2.80 < f_{OJTW}/f_W < -1.80 \qquad (13)$$

(here, $Z=f_T/f_W>5.0$)

where,
- $f_{OJTW}$ is a composite focal length of the lens unit located on the object side relative to the reflecting surface at the wide-angle limit,
- $f_W$ is the focal length of the entire zoom lens system at the wide-angle limit, and
- $f_T$ is the focal length of the entire zoom lens system at the telephoto limit.

22. The lens barrel as claimed in claim 6, wherein
the imaging optical system is a zoom lens system, in order from the object side to the image side, comprising: a first lens unit having positive optical power; a second lens unit including the reflective optical element and having negative optical power; a third lens unit having positive optical power and a fourth lens unit having positive optical power, and wherein
the imaging optical system satisfies the following condition (14):

$$4.00 < f_4/f_W < 7.00 \qquad (14)$$

(here, $Z=f_T/f_W>5.0$)

where,
- $f_4$ is a composite focal length of the fourth lens unit,
- $f_W$ is the focal length of the entire zoom lens system at the wide-angle limit, and
- $f_T$ is the focal length of the entire zoom lens system at the telephoto limit.

23. The lens barrel as claimed in claim 6, wherein
the imaging optical system is a zoom lens system, in order from the object side to the image side, comprising: a first lens unit having positive optical power; a second lens unit including the reflective optical element and having negative optical power; a third lens unit having positive optical power and a fourth lens unit having positive optical power, and wherein
the imaging optical system satisfies the following condition (15):

$$-0.25 < \beta_{T4}/\beta_{W4} < 0.80 \qquad (15)$$

(here, $Z=f_T/f_W>5.0$, $\beta_{T4}/\beta_{W4} \ne 0$)

where,
- $\beta_{T4}$ is a magnification of the fourth lens unit at the telephoto limit in the infinity in-focus condition,
- $\beta_{W4}$ is a magnification of the fourth lens unit at the wide-angle limit in the infinity in-focus condition,
- $f_W$ is the focal length of the entire zoom lens system at the wide-angle limit, and
- $f_T$ is the focal length of the entire zoom lens system at the telephoto limit.

24. The lens barrel as claimed in claim 6, wherein
the imaging optical system is a zoom lens system, in order from the object side to the image side, comprising: a first lens unit having positive optical power; a second lens unit including the reflective optical element and having negative optical power; a third lens unit having positive optical power and a fourth lens unit having positive optical power, and wherein
the imaging optical system satisfies the following condition (16):

$$2.00 < f_3/f_4 < 5.00 \qquad (16)$$

(here, $Z=f_T/f_W>5.0$)

where,
- $f_3$ is a composite focal length of the third lens unit,
- $f_4$ is the composite focal length of the fourth lens unit,
- $f_W$ is the focal length of the entire zoom lens system at the wide-angle limit, and
- $f_T$ is the focal length of the entire zoom lens system at the telephoto limit.

* * * * *